US012804109B2

(12) United States Patent
Kim et al.

(10) Patent No.: US 12,804,109 B2
(45) Date of Patent: Nov. 17, 2026

(54) PHOSPHOR WHEEL DEVICE AND IMAGE PROJECTION APPARATUS INCLUDING THE SAME

(71) Applicant: LG ELECTRONICS INC., Seoul (KR)

(72) Inventors: Minsung Kim, Seoul (KR); Gunyoung Hong, Seoul (KR); Younggil Yoo, Seoul (KR); Kyungpil Kim, Seoul (KR); Bokyung Kang, Seoul (KR); Seungmi Baek, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 365 days.

(21) Appl. No.: 18/686,320

(22) PCT Filed: Aug. 24, 2021

(86) PCT No.: PCT/KR2021/011264
§ 371 (c)(1),
(2) Date: Feb. 23, 2024

(87) PCT Pub. No.: WO2023/027204
PCT Pub. Date: Mar. 2, 2023

(65) Prior Publication Data
US 2026/0156233 A1 Jun. 4, 2026

(51) Int. Cl.
*H04N 9/31* (2006.01)
*G02B 26/00* (2006.01)
(Continued)

(52) U.S. Cl.
CPC ......... *H04N 9/3144* (2013.01); *G02B 26/008* (2013.01); *G03B 21/16* (2013.01);
(Continued)

(58) Field of Classification Search
CPC .... G03B 21/16; G03B 21/145; G03B 21/204; G03B 21/208; G03B 21/2013;
(Continued)

(56) References Cited

U.S. PATENT DOCUMENTS

2017/0026624 A1* 1/2017 Dai .................... H04N 9/3111
2017/0201730 A1* 7/2017 Jeoung ................ G02B 26/008
(Continued)

FOREIGN PATENT DOCUMENTS

JP 2015-206940 A 11/2015
JP 2017-111176 A 6/2017
(Continued)

*Primary Examiner* — Sultan Chowdhury
(74) *Attorney, Agent, or Firm* — Birch, Stewart, Kolasch & Birch, LLP

(57) ABSTRACT

A phosphor wheel device and an image projection apparatus including the same are disclosed. The phosphor wheel device according to an embodiment of the present disclosure includes: a plate to rotate around a rotation axis, and including a base extending in a first direction and a protruding member attached to both ends of the base and extending in a second direction intersecting the first direction; a phosphor layer disposed in one region of the base and configured to output light of at least one color by reflecting light incident on the base; and a blade spaced apart from the plate in the second direction and to rotate around the rotation axis. Accordingly, heat dissipation performance may be improved, and high brightness light output may be provided.

18 Claims, 20 Drawing Sheets

210a

(51) Int. Cl.

| | |
|---|---|
| ***G03B 21/16*** | (2006.01) |
| ***G03B 21/20*** | (2006.01) |
| ***G03B 33/08*** | (2006.01) |

(52) U.S. Cl.
CPC ........... *G03B 21/204* (2013.01); *G03B 33/08* (2013.01); *H04N 9/3158* (2013.01); *H04N 9/3161* (2013.01)

(58) Field of Classification Search
CPC .... G03B 21/2033; G03B 33/00; G03B 33/08; H04N 9/312; H04N 9/3111; H04N 9/3114; H04N 9/3117; H04N 9/3141; H04N 9/3144; H04N 9/3152; H04N 9/3158; H04N 9/3161; H04N 9/3164; G02B 26/00; G02B 26/08
See application file for complete search history.

(56) References Cited

U.S. PATENT DOCUMENTS

| | | | | |
|---|---|---|---|---|
| 2017/0261844 | A1* | 9/2017 | Kitade | H04N 9/3158 |
| 2019/0146314 | A1* | 5/2019 | Yoshikawa | G03B 21/204 362/84 |
| 2020/0109899 | A1* | 4/2020 | Sano | F28D 15/04 |
| 2020/0271301 | A1* | 8/2020 | Hu | F21V 9/40 |
| 2020/0348585 | A1* | 11/2020 | Hsieh | G03B 21/2066 |
| 2022/0075245 | A1* | 3/2022 | Kang | G03B 21/204 |

FOREIGN PATENT DOCUMENTS

| | | | |
|---|---|---|---|
| JP | 2019-91011 | A | 6/2019 |
| KR | 1999-0062141 | A | 7/1999 |
| KR | 10-2020-0091162 | A | 7/2020 |
| WO | WO 2019/131730 | A1 | 7/2019 |

* cited by examiner

PHOSPHOR WHEEL DEVICE AND IMAGE PROJECTION APPARATUS INCLUDING THE SAME

CROSS REFERENCE TO RELATED APPLICATION

This application is the National Phase of PCT International Application No. PCT/KR2021/011264, filed on Aug. 24, 2021, which is hereby expressly incorporated by reference into the present application.

BACKGROUND

1. Field

The present disclosure relates to a phosphor wheel device and an image projection apparatus including the same, and more particularly to a phosphor wheel device capable of improving heat dissipation performance and providing high brightness light output, and an image projection apparatus including the phosphor wheel device.

2. Description of the Related Art

A phosphor wheel device, disposed in an image projection apparatus, is a device for outputting light of a color corresponding to a coated phosphor on which light is incident upon rotation.

Meanwhile, the phosphor wheel device has a problem in that temperature often rises due to the light incident upon rotation, and the temperature rise causes a reduction in conversion efficiency when light is output from the phosphor.

Korean Laid-open Patent Publication No. 2008-0001077 (hereinafter referred to as related art) discloses a color wheel cooling structure of a projection system for cooling a color wheel rotating at a high speed.

Particularly, the related art discloses a color wheel cooling fan and a cooling path for cooling a color wheel rotating at a high speed.

However, the related art has a drawback in that due to the introduction of dust and the like, only the air inside a sealed case flows to cool the color wheel, such that it is actually difficult to reduce the temperature, and if the temperature in a light source system exceeds about 200° C., reliability is deteriorated.

SUMMARY

It is an object of the present disclosure to provide a phosphor wheel device capable of improving heat dissipation performance and providing high brightness light output, and an image projection apparatus including the same.

It is another object of the present disclosure to provide a phosphor wheel device capable of enhancing durability with improved heat dissipation performance, and an image projection apparatus including the same.

In order to achieve the above and other objects, a phosphor wheel device and an image projection apparatus including the same according to an embodiment of the present disclosure include: a plate to rotate around a rotation axis, and comprising a base extending in a first direction and a protruding member attached to both ends of the base and extending in a second direction intersecting the first direction; a phosphor layer disposed in one region of the base and configured to output light of at least one color by reflecting light incident on the base; and a blade spaced apart from the plate in the second direction and to rotate around the rotation axis.

Meanwhile, a horizontal distance between the protruding member and the blade may be greater than a distance between the rotation axis and the phosphor layer.

Meanwhile, a distance between an incident point of light, which is incident on the base, and the rotation axis may be greater than or equal to a distance between the rotation axis and an end of the blade.

Meanwhile, a height of the blade may be greater than a distance between the base and the blade.

Meanwhile, the height of the blade may be greater than a height of the base.

Meanwhile, a height of the protruding member may be greater than the height of the blade.

Meanwhile, the phosphor layer may include: a yellow phosphor disposed in the first region of the base and configured to output yellow light based on blue light incident on the base; and a green phosphor disposed in a second region of the base and configured to output green light based on the blue light incident on the base.

Meanwhile, the phosphor layer may further include a red phosphor disposed in a third region of the base and configured to output red light based on the blue light incident on the base.

Meanwhile, the phosphor wheel device and the image projection apparatus including the same may further include: a reflective layer disposed on the phosphor layer and the base; and an anti-reflection layer disposed on the phosphor layer.

Meanwhile, the phosphor layer may be sintered and processed into a ceramic form, and then may be adhered to the base.

Meanwhile, the reflective layer may include silicone resin and Titanium dioxide ($TiO2$) nanopowder.

Meanwhile, the blade may include: a base substrate having an opening formed at a center thereof; a first edge bonded to an end of the base substrate and inclined at a predetermined angle; and a second edge formed at one end of the first edge and spaced apart from another portion of the first edge to form a second opening.

Meanwhile, the second edge may be parallel to the base substrate.

Meanwhile, the base may include a first base part having a first height and a second base part having a second height greater than the first height, wherein the protruding member may be attached to both ends of the second base part and may extend in the second direction intersecting the first direction.

Meanwhile, the protruding member may include: a first protruding member attached to a first end of the base; and a second protruding member attached to a second end of the base, wherein a width of the first protruding member may be different from a width of the second protruding member.

Meanwhile, the phosphor wheel device and the image projection apparatus including the same may further include: motor configured to rotate the blade; and a controller configured to control a rotation speed of the motor, wherein the controller may be configured to control the rotation speed of the motor to remain constant.

Meanwhile, the phosphor wheel device and the image projection apparatus including the same may further include: a motor configured to rotate the blade; a temperature sensor configured to sense temperature of the plate; and a controller configured to control a rotation speed of the motor, wherein the controller may be configured to increase the rotation speed of the motor as the temperature sensed by the temperature sensor increases.

Effects of the Disclosure

A phosphor wheel device and an image projection apparatus including the same according to an embodiment of the present disclosure include: a plate to rotate around a rotation axis, and comprising a base extending in a first direction and a protruding member attached to both ends of the base and extending in a second direction intersecting the first direction; a phosphor layer disposed in one region of the base and configured to output light of at least one color by reflecting light incident on the base; and a blade spaced apart from the plate in the second direction and to rotate around the rotation axis. Accordingly, air flows to a lower portion of the plate where the phosphor layer is disposed, and the air is discharged to a lower portion of the protruding member, thereby improving heat dissipation performance, and besides, providing high brightness light output.

Further, durability of the phosphor wheel device may be enhanced with improved heat dissipation performance.

Meanwhile, a horizontal distance between the protruding member and the blade may be greater than a distance between the rotation axis and the phosphor layer. Accordingly, air flows to a lower portion of the plate where the phosphor layer is disposed, and the air is discharged to a lower portion of the protruding member, thereby improving heat dissipation performance, and besides, providing high brightness light output.

Meanwhile, a distance between an incident point of light, which is incident on the base, and the rotation axis may be greater than or equal to a distance between the rotation axis and an end of the blade. Accordingly, air flows to a lower portion of the plate where the phosphor layer is disposed, and the air is discharged to a lower portion of the protruding member, thereby improving heat dissipation performance, and besides, providing high brightness light output.

Meanwhile, a height of the blade may be greater than a distance between the base and the blade. Accordingly, air flows to a lower portion of the plate where the phosphor layer is disposed, and the air is discharged to a lower portion of the protruding member, thereby improving heat dissipation performance, and besides, providing high brightness light output.

Meanwhile, the height of the blade may be greater than a height of the base. Accordingly, air flows to a lower portion of the plate where the phosphor layer is disposed, and the air is discharged to a lower portion of the protruding member, thereby improving heat dissipation performance, and besides, providing high brightness light output.

Meanwhile, a height of the protruding member may be greater than the height of the blade. Accordingly, air flows to a lower portion of the plate where the phosphor layer is disposed, and the air is discharged to a lower portion of the protruding member, thereby improving heat dissipation performance, and besides, providing high brightness light output.

Meanwhile, the phosphor layer may include: a yellow phosphor disposed in the first region of the base and configured to output yellow light based on blue light incident on the base; and a green phosphor disposed in a second region of the base and configured to output green light based on the blue light incident on the base. Accordingly, the yellow light and the green light may be output by the phosphor wheel device.

Meanwhile, the phosphor layer may further include a red phosphor disposed in a third region of the base and configured to output red light based on the blue light incident on the base. Accordingly, the yellow light, the green light, and the red light may be output by the phosphor wheel device.

Meanwhile, the phosphor wheel device and the image projection apparatus including the same may further include: a reflective layer disposed on the phosphor layer and the base; and an anti-reflection layer disposed on the phosphor layer. Accordingly, high brightness light output may be provided.

Meanwhile, the phosphor layer may be sintered and processed into a ceramic form, and then may be adhered to the base. Accordingly, high brightness light output may be provided.

Meanwhile, the reflective layer may include silicone resin and Titanium dioxide (TiO2) nanopowder. Accordingly, high brightness light output may be provided.

Meanwhile, the blade may include: a base substrate having an opening formed at a center thereof; a first edge bonded to an end of the base substrate and inclined at a predetermined angle; and a second edge formed at one end of the first edge and spaced apart from another portion of the first edge to form a second opening. Accordingly, air flow performance of the introduced air and discharged air may be improved.

Meanwhile, the second edge may be parallel to the base substrate. Accordingly, air flow performance of the introduced air and discharged air may be improved.

Meanwhile, the base may include a first base part having a first height and a second base part having a second height greater than the first height, wherein the protruding member may be attached to both ends of the second base part and may extend in the second direction intersecting the first direction. Accordingly, heat dissipation performance at the lower portion of the plate where the phosphor layer is disposed may be improved. Further, high brightness light output may be provided.

Meanwhile, the protruding member may include: a first protruding member attached to a first end of the base; and a second protruding member attached to a second end of the base, wherein a width of the first protruding member may be different from a width of the second protruding member. Accordingly, heat dissipation performance at the lower portion of the plate where the phosphor layer is disposed may be improved. Further, high brightness light output may be provided.

Meanwhile, the phosphor wheel device and the image projection the same may further include: motor configured to rotate the blade; and a controller configured to control a rotation speed of the motor, wherein the controller may be configured to control the rotation speed of the motor to remain constant. Accordingly, heat dissipation performance at the lower portion of the plate where the phosphor layer is disposed may be improved. Further, high brightness light output may be provided.

Meanwhile, the phosphor wheel device and the image projection apparatus including the same may further include: a motor configured to rotate the blade; a temperature sensor configured to sense temperature of the plate; and a controller configured to control a rotation speed of the motor, wherein the controller may be configured to increase the rotation speed of the motor as the temperature sensed by the temperature sensor increases. Accordingly, heat dissipation performance at the lower portion of the plate where the phosphor layer is disposed may be improved. Further, high brightness light output may be provided.

DETAILED DESCRIPTION OF THE PREFERRED EMBODIMENTS

Hereinafter, embodiments of the present disclosure will be described in detail with reference to the accompanying drawings.

The terms "module" and "unit," when attached to the names of components are used herein to help the understanding of the components and thus they should not be considered as having specific meanings or roles. Accordingly, the terms "module" and "unit" may be used interchangeably.

An optical device as described in this specification is a device that is capable of outputting a visible light. The optical device may be applied to an image projection apparatus. Alternatively, the optical device may also be applied to a lighting apparatus.

Meanwhile, an image projection apparatus as described in this specification is an apparatus that is capable of projecting an image to the outside. For example, the image projection apparatus may be a projector.

Meanwhile, the image projection apparatus as described in this specification may be mounted as a component in another apparatus. For example, the image projection apparatus may be mounted in a mobile terminal. Alternatively, the image projection apparatus may be mounted in an electric home appliance, such as an air conditioner, a refrigerator, a cooking apparatus, or a robot cleaner. Alternatively, the image projection apparatus may also be mounted in a vehicle, such as a car.

Hereinafter, the image projection apparatus will be described in detail.

Figure 1:
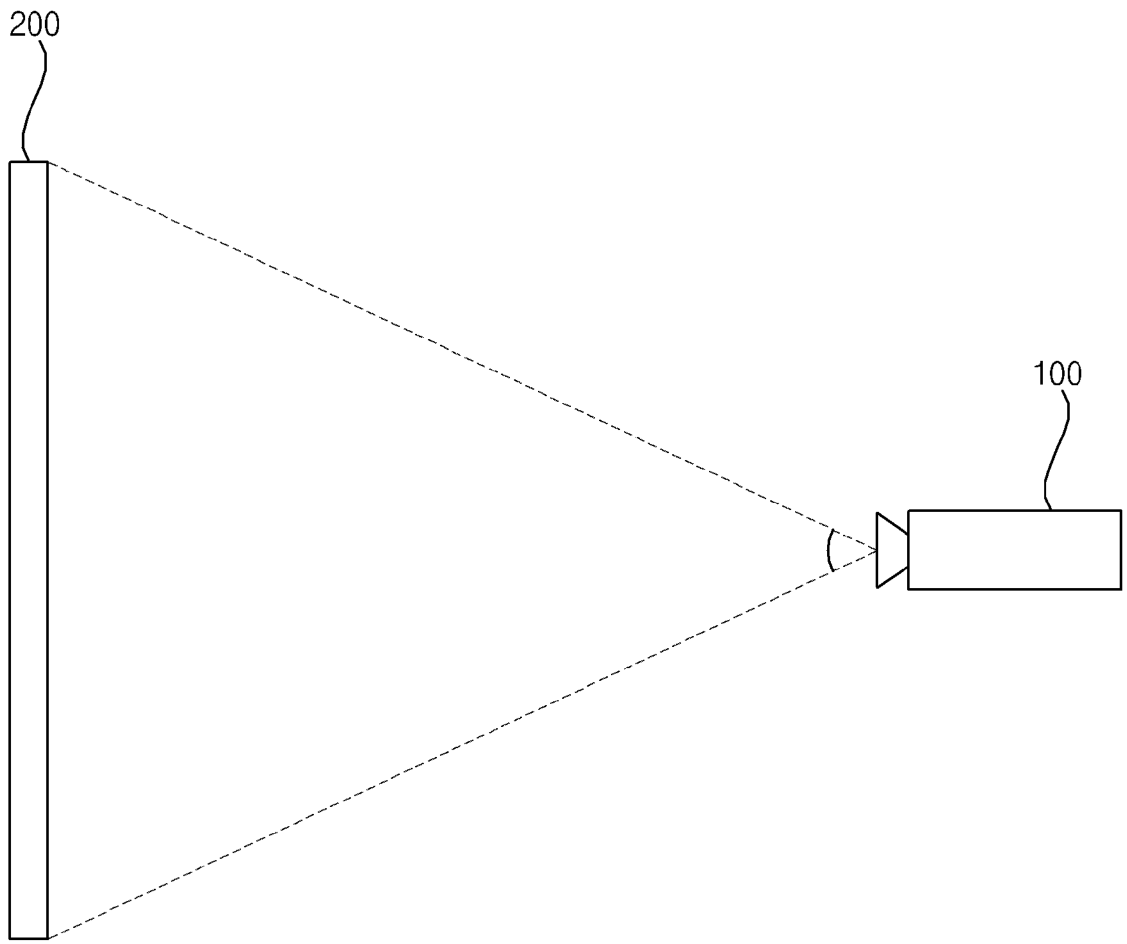
FIG. 1 is a diagram illustrating the exterior of an image projection apparatus according to an embodiment of the present disclosure.

FIG. 1 is a diagram illustrating the exterior of an image projection apparatus according to an embodiment of the present disclosure.

Referring to the drawing, an image projection apparatus 100 may project an image on a screen 200.

In the drawing, an example is illustrated in which the screen 200 has a flat surface but may also have a curved surface.

A user may view the image projected on the screen 200.

Figure 2:
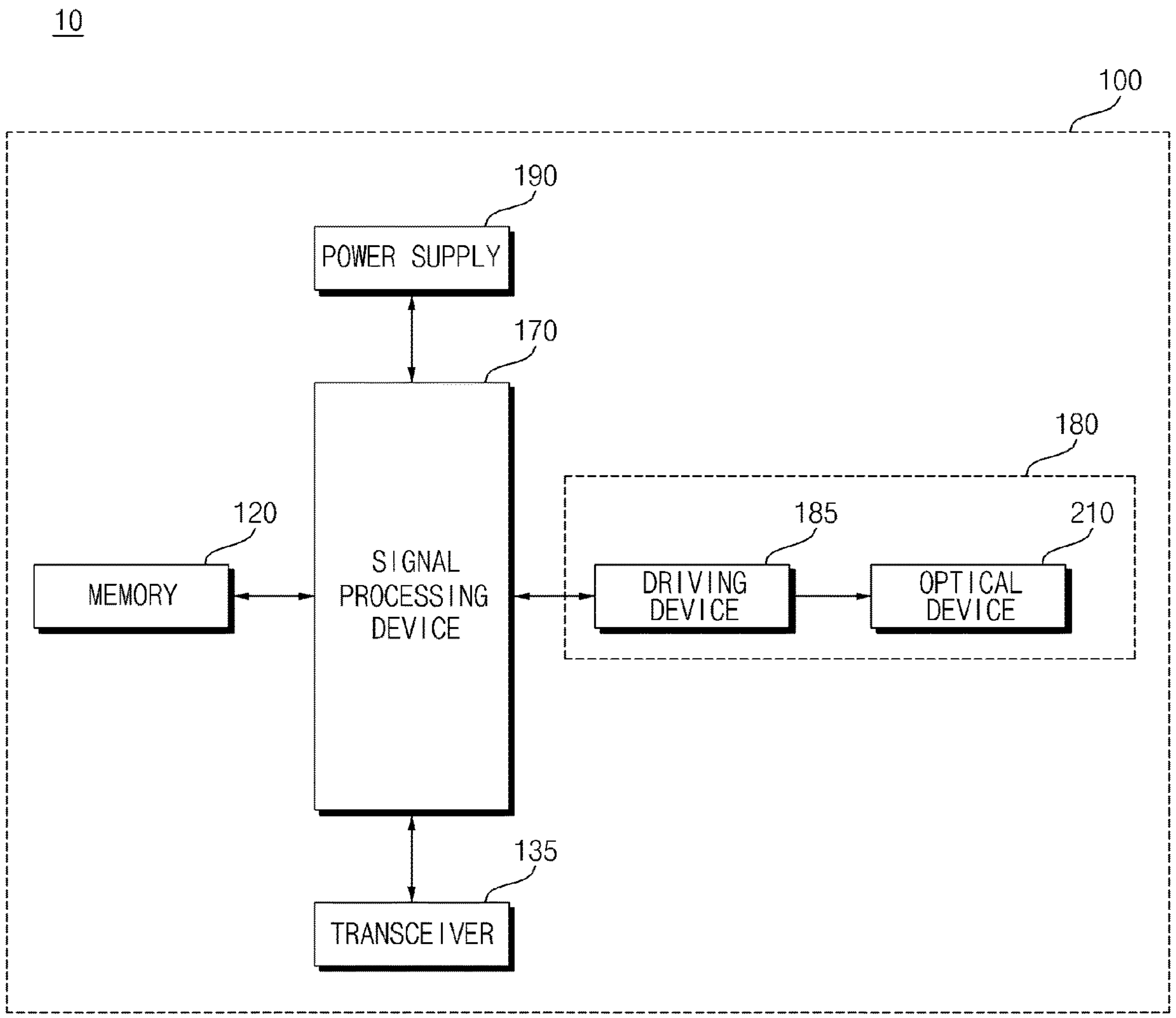
FIG. 2 is an exemplary internal block diagram of the image projection apparatus of FIG. 1.

FIG. 2 is an exemplary internal block diagram of the image projection apparatus of FIG. 1.

Referring to the drawing, the image projection apparatus 100 may include a memory 120, a signal processing device 170, a transceiver 135, an image output device 180, and a power supply 190.

Meanwhile, the image output device 180 may include a driving device 185 and an optical device 210.

The driving device 185 may drive the optical device 210, particularly a light source mounted in the optical device 210.

The optical device 210 may include optical elements, such as a light source and a lens, for light output, particularly visible light output.

Particularly, in the embodiments of the present disclosure, there is provided an optical device capable of improving heat dissipation performance and providing high brightness light output, which will be described in detail with reference to FIG. 4 and subsequent figures.

The memory 120 may store programs for processing and control by the signal processing device 170 and may temporarily store input and output data (e.g., still and moving image, etc.).

The transceiver 135 functions as an interface with all external devices connected by wire or wirelessly to the image projection apparatus 100 or a network. The transceiver 135 may transmit data or power, received from the external devices, to each component in the image projection apparatus 100, and may transmit data from the image projection apparatus 100 to the external devices.

Particularly, the transceiver 135 may receive a wireless signal from an adjacent mobile terminal (not shown). Here, the wireless signal may include a voice call signal, a video communication call signal, or various types of data, such as text data and image data, and the like.

To this end, the transceiver 135 may include a short range communication module (not shown). Bluetooth, radio frequency identification (RFID), infrared data association (IrDA), ultra wideband (UWB), ZigBee, or near field communication (NFC) may be used as short range communication technology.

The signal processing device 170 may control the overall operation of the image projection apparatus 100. Specifically, the signal processing device 170 may control the operation of each unit in the image projection apparatus 100.

The signal processing device 170 may control video images stored in the memory 120 or video images received from an external source through the transceiver 135 to be projected to the outside as projected images.

To this end, the signal processing device 170 may control the driving device 185 for controlling the optical device 210 that outputs a visible light including red (R), green (G), and blue (B) lights. Specifically, R, G, and B signals corresponding to a video to be displayed may be output to the driving device 185.

The power supply 190 may supply external power or internal power to the respective components under the control of the signal processing device 170.

The power supply 190 may supply power to the image projection apparatus 100. Particularly, the power supply 190 may supply power to the image projection apparatus 100 which may be implemented in the form of a system-on-chip (SoC), the image display device 180 for displaying images, and an audio output device (not shown) for audio output.

Figure 3:
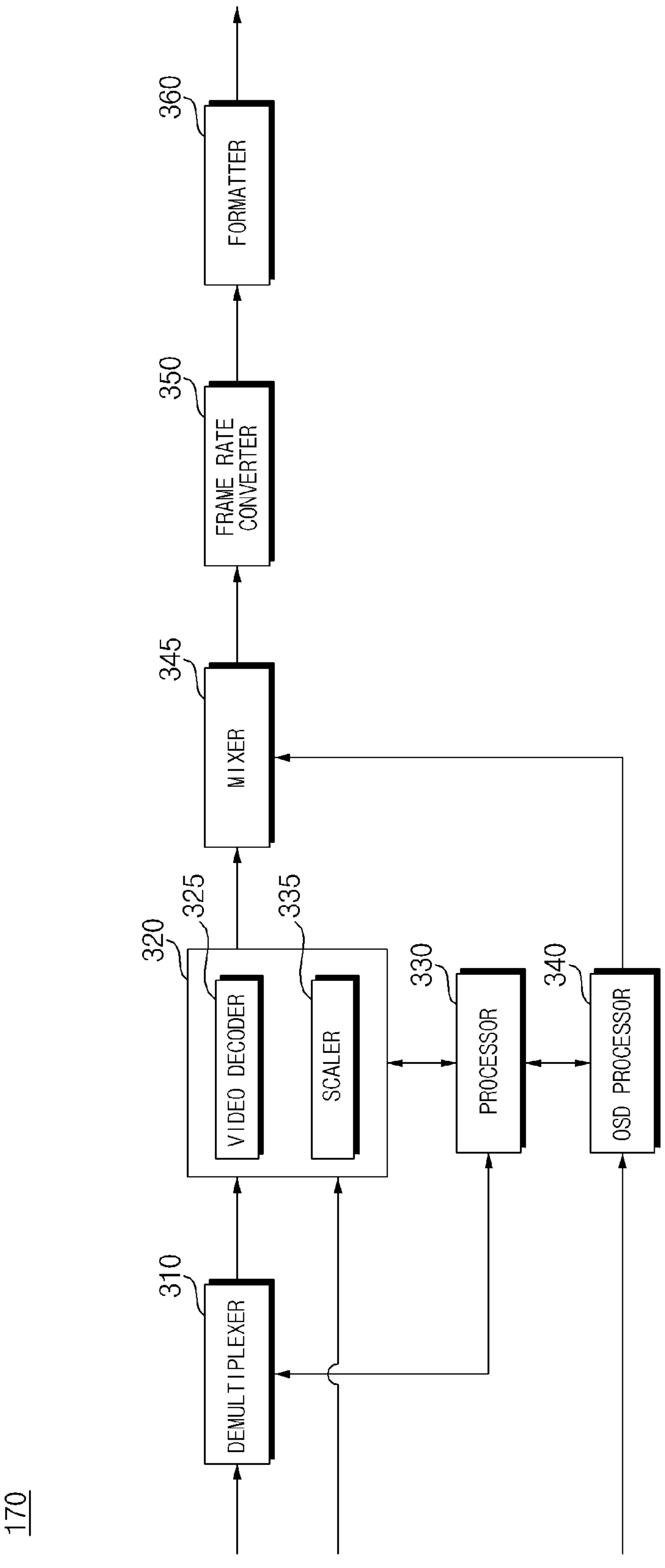
FIG. 3 is an exemplary internal block diagram of a signal processing device of FIG. 2.

FIG. 3 is an internal block diagram of a controller of FIG. 2.

Referring to the drawing, the signal processing device 170 according to an embodiment of the present disclosure may include a multiplexer 310, an image processor 320, a processor 330, an OSD generator 340, a mixer 345, a frame rate converter 350, and a formatter 360. In addition, the signal processing device 170 may further include an audio processing device (not shown) and a data processing device (not shown).

The demultiplexer 310 may demultiplex an input stream.

The image processor 320 may perform image processing on the demultiplexed image signal. To this end, the image processor 320 may include an image decoder 225 and a scaler 235.

The image decoder 225 may decode the demultiplexed image signal, and the scaler 235 performs scaling so that the resolution of the decoded image signal may be output from the image output device 180. The image decoder 225 may include a decoder of various standards.

The processor 330 may control the overall operation of the image projection apparatus 100 or the signal processing device 170. In addition, the processor 330 may control the operation of demultiplexer 310, the image processor 320, the OSD generator 340, and the like.

The OSD generator 340 generate an OSD signal according to a user input or by itself.

The mixer 345 may mix the OSD signal, generated by the OSD generator 340, with the decoded image signal processed by the image processor 320. The mixed image signal may be provided to the frame rate converter 350.

The frame rate converter (FRC) 350 may convert a frame rate of an input image. Meanwhile, the frame rate converter 350 may output the image as it is without separate conversion of its frame rate.

Meanwhile, the formatter 360 may receive the signal mixed by the mixer 345, i.e., the OSD signal and the decoded image signal, and may perform signal conversion to input the signal to the image output device 180. For example, the formatter 360 may output a low voltage differential signal (LVDS).

Meanwhile, the block diagram of the signal processing device 170 illustrated in FIG. 3 is a block diagram for an embodiment of the present disclosure. Each component of the block diagram may be integrated, added, or omitted according to a specification of the signal processing device 170 actually implemented.

Particularly, the frame rate converter 350 and the formatter 360 may not be provided in the signal processing device 170 but may be separately provided, or may be provided as a single module.

Figure 4:
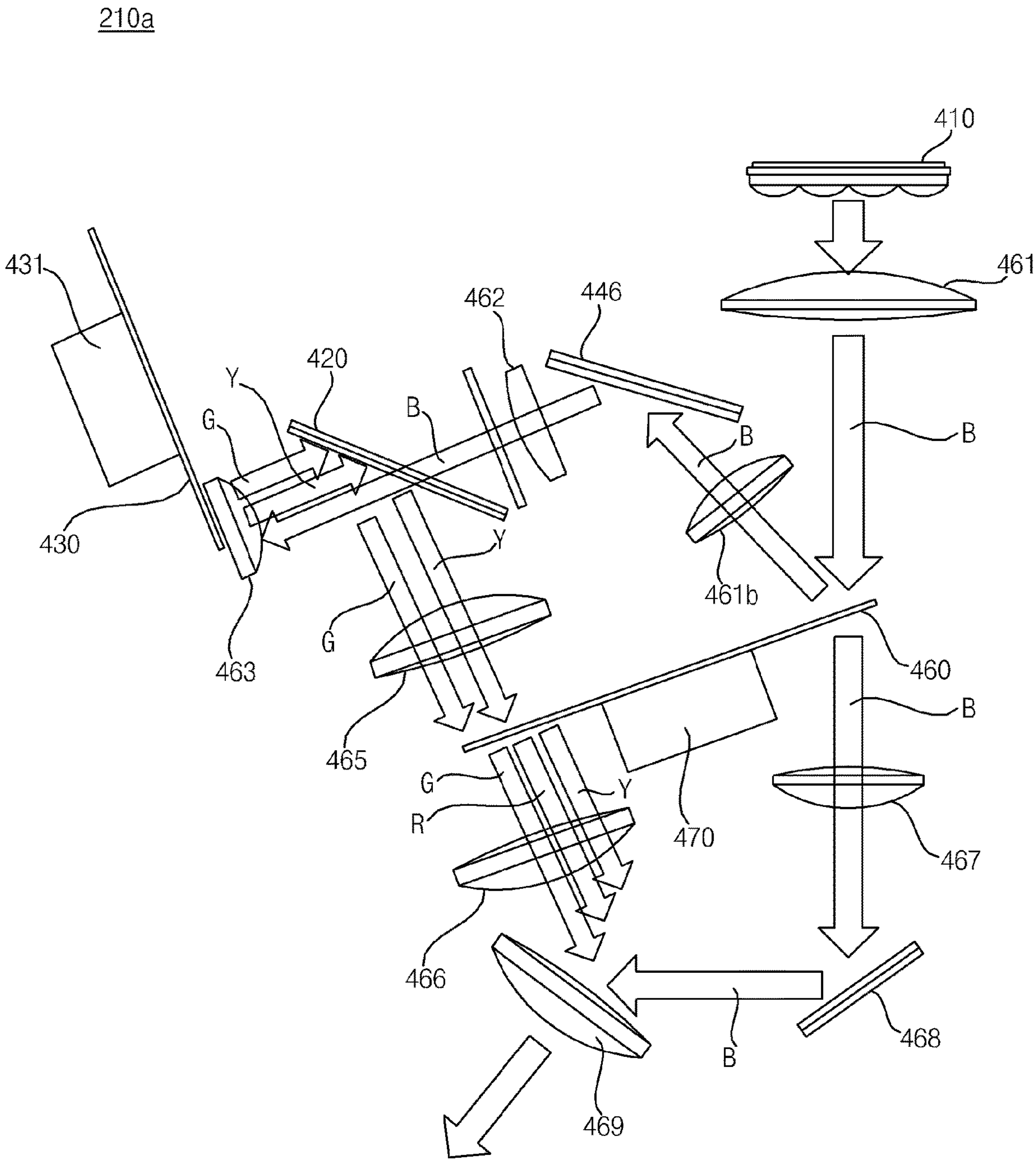
FIG. 4 is a diagram illustrating an example of a structure of an optical device of FIG. 2.

FIG. 4 is a diagram illustrating an example of a structure of the optical device of FIG. 2.

Referring to the drawing, an optical device 210*a* according to an embodiment of the present disclosure includes a light source 410 configured to output blue light B, and a phosphor wheel device 430 which outputs a plurality of colors of light based on the blue light B incident upon rotation.

Meanwhile, the light source 410 for outputting the blue light B may include a laser diode and the like. For example, the laser diode 410 may output a blue laser beam B.

The blue light B output by the light source 410 may be collected through a collimator lens 461, to be incident on the color filter 460.

The optical device 210*a* according to an embodiment of the present disclosure may further include the color filter 460 which is placed behind an output end of the phosphor wheel device 430, and is rotated to sequentially output yellow light Y, green light G, and red light R.

For example, the color filter 460 may include a yellow region ARa for the output of yellow light Y, a green region ARb for the output of green light G, a red region ARc for the output of red light R, and a blue region ARd for the output of the blue light B.

If the blue light B emitted from the light source 410 is incident on the yellow region ARa, the green region ARb, or the red region Arc for the output of the red light R, the color filter 460 reflects the blue light B.

The blue light B reflected by the color filter 460 may pass through a collimator lens 461*b* to be incident on a first reflective mirror 446.

The first reflective mirror 446 reflects the incident blue light B, and the blue light B reflected by the first reflective mirror 446 passes through a collimator lens 462 to be incident on a beam splitter 420.

The beam splitter 420 transmits the incident blue light B, and reflects the remaining yellow light Y, green light G, or red light R.

The blue light B, transmitted through the beam splitter 420, passes through a collimator lens 463 to be incident on the phosphor wheel device 430.

The phosphor wheel device 430 outputs a plurality of colors of light based on the blue light B incident upon rotation.

Specifically, the phosphor wheel device 430 includes a yellow phosphor PHY for the output of yellow light Y and a green phosphor PHG for the output of green light G.

If the blue light B is incident on the yellow phosphor PHY in the phosphor wheel device 430, the phosphor wheel device 430 reflects and outputs the yellow light Y.

Meanwhile, if the blue light B is incident on the green phosphor PHG in the phosphor wheel device 430, the phosphor wheel device 430 reflects and outputs the green light G.

The yellow light Y and the green light G, which are sequentially output by the phosphor wheel device 430, are incident on the beam splitter 420, and the beam splitter 420 reflects the yellow light Y and the green light G.

The yellow light Y and the green light G, which are reflected by the beam splitter 420, are incident on the color filter 460.

If the yellow light Y reflected by the beam splitter 420 is incident on the yellow region ARa of the color filter 460, the color filter 460 transmits and outputs the yellow light Y.

If the green light G reflected by the beam splitter 420 is incident on the green region ARb of the color filter 460, the color filter 460 transmits and outputs the green light G.

If the yellow light Y or the green light G, reflected by the beam splitter 420, is incident on the red region ARc of the color filter 460, the color filter 460 transmits and outputs the red light R.

The yellow light Y, the green light G, and the red light R from the color filter 460 are output in a first direction by a collimator lens 469.

Meanwhile, the blue light B transmitted through the color filter 460 passes through a second reflective mirror 468 to be output in the first direction by the collimator lens 463.

Accordingly, the yellow light Y, the green light G, the red light R, and the blue light B are sequentially output in the first direction.

Figure 5:
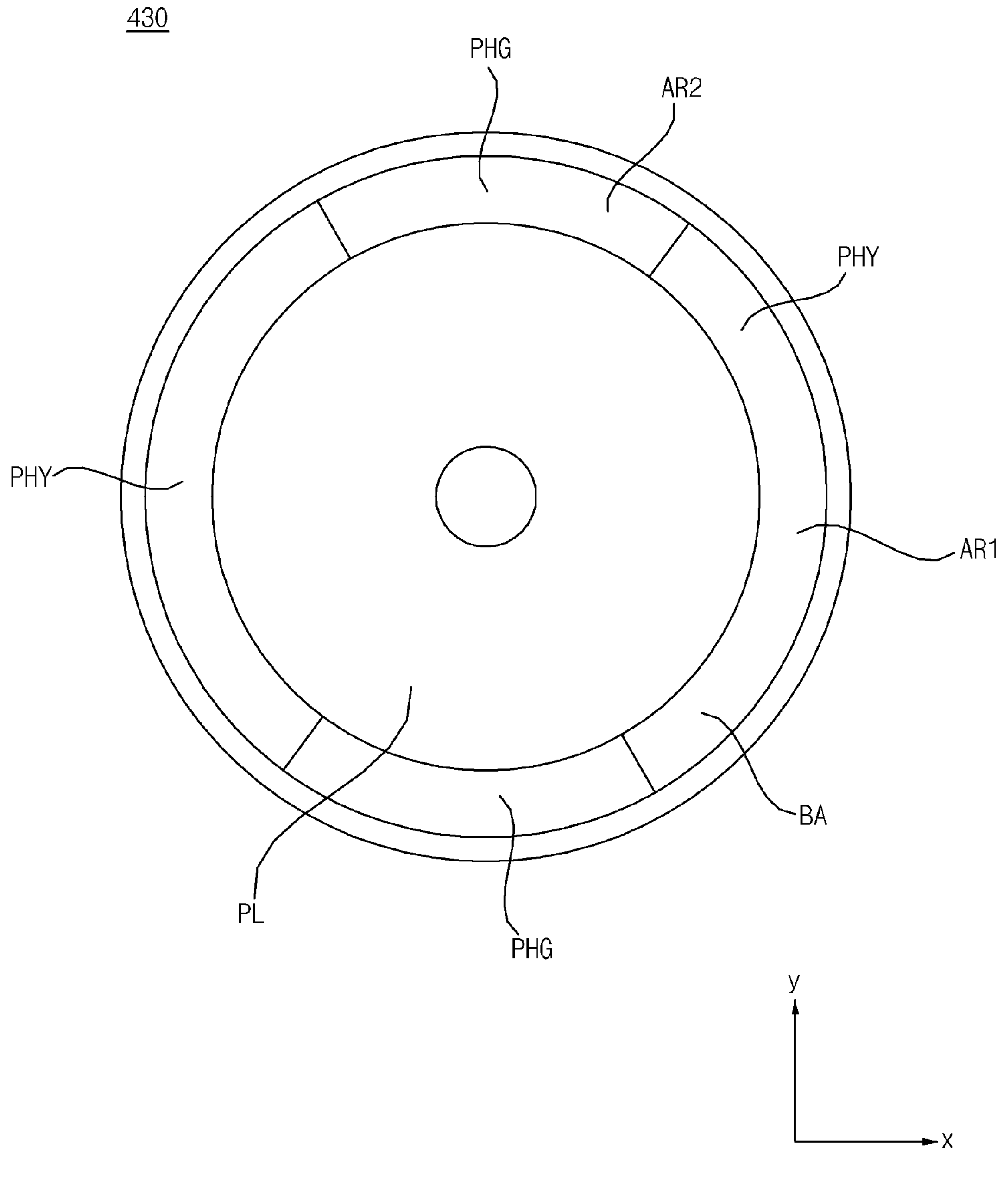
FIG. 5 is an exemplary top view of the phosphor wheel of FIG. 4.

FIG. 5 is an exemplary top view of the phosphor wheel of FIG. 4.

Referring to the drawing, a phosphor wheel device 430 according to an embodiment of the present disclosure includes a plate PL, a yellow phosphor PHY disposed in a first region AR1 on the plate PL and configured to output yellow light Y, and a green phosphor PHG disposed in a second region AR2 on the plate PL and configured to output green light G.

The plate PL may include, for example, an aluminum (Al) base.

Meanwhile, the phosphor wheel device 430 may further include a reflective layer LA disposed between the plate PL and the yellow phosphor PHY or the green phosphor PHG. By using the reflective layer LA, high brightness light output may be provided when yellow light or green light is output from the yellow phosphor PHY or the green phosphor PHG.

Meanwhile, the reflective layer LA may include silicone resin and Titanium dioxide (TiO2) nanopowder, thereby providing high brightness light output.

Meanwhile, the phosphor wheel device 430 may be rotated by a wheel motor 431.

Meanwhile, a size of the first region AR1 is preferably greater than a size of the second region AR2. That is, a size of the first region AR1 coated with the green phosphor PHG is preferably greater than a size of the second region AR2 coated with the yellow phosphor PHY. Accordingly, high brightness light output may be provided.

Meanwhile, a phosphor PH applied on the phosphor wheel device 430 may be sintered and processed into a ceramic form, and then may be adhered to a base BS. Accordingly, high brightness light output may be provided.

Meanwhile, a thickness of the phosphor layer PH applied on the phosphor wheel device 430 is preferably greater than a thickness of the reflective layer LA.

Meanwhile, unlike FIG. 5, a red phosphor PHR for the output of red light may be further applied on the phosphor wheel device 430, in addition to the yellow phosphor PHY and the green phosphor PHG.

Accordingly, if the blue light B is incident on the yellow phosphor PHY in a phosphor wheel device 430*b*, the phosphor wheel device 430*b* reflects and outputs the yellow light Y; if the blue light B is incident on the green phosphor PHG in the phosphor wheel device 430*b*, the phosphor wheel device 430*b* reflects and outputs the green light G; and if the blue light B is incident on the red phosphor PHR in the phosphor wheel device 430*b*, the phosphor wheel device 430*b* reflects and outputs the red light R.

Figure 6:
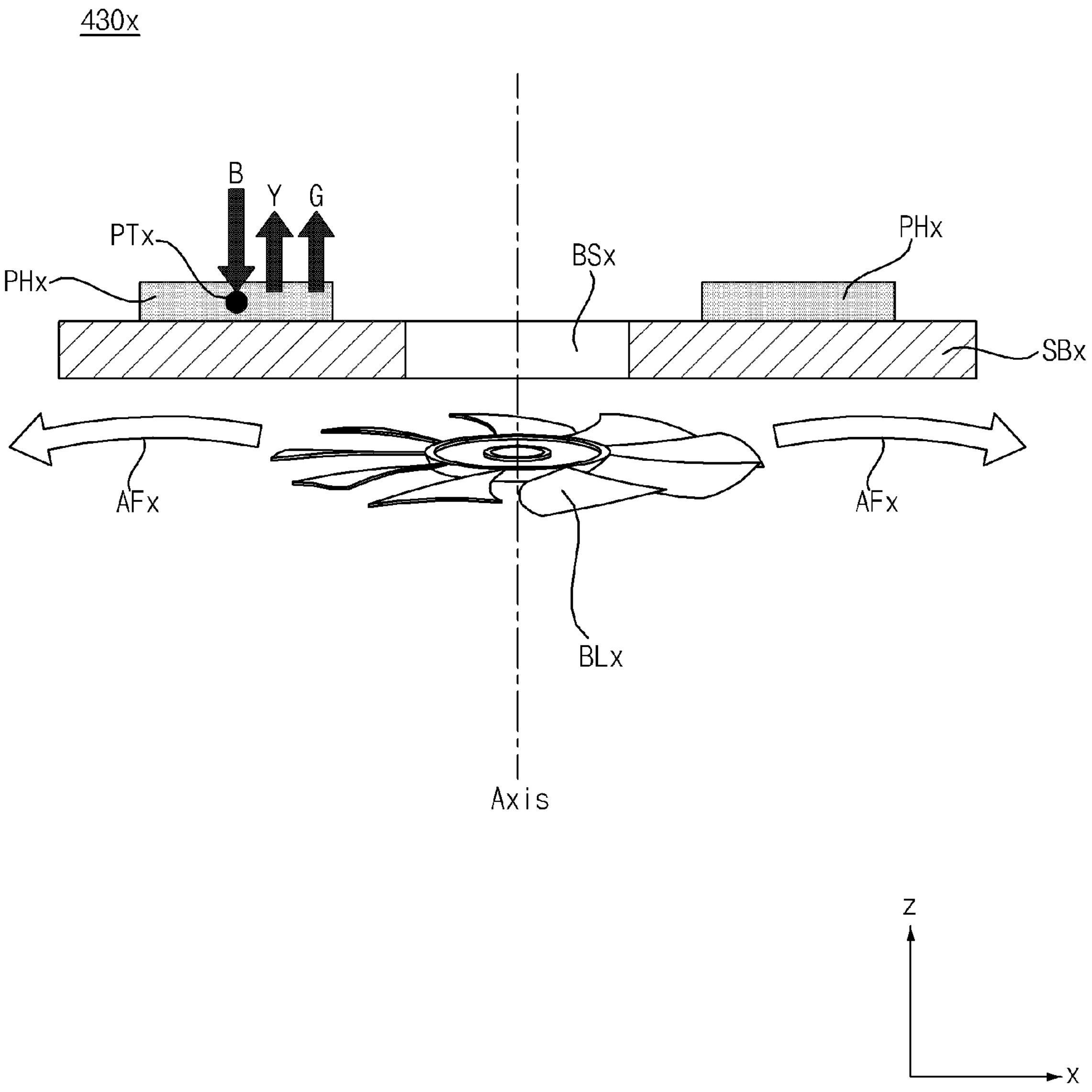
FIG. 6 is an exemplary cross-sectional view of a phosphor wheel device associated with the present disclosure.

FIG. 6 is an exemplary cross-sectional view of a phosphor wheel device associated with the present disclosure.

Referring to the drawing, a phosphor wheel device 430*x* associated with the present disclosure includes a substrate SBx having an opening BSx formed at the center thereof, a phosphor PHX disposed on the substrate SBx, and a blade BLx spaced below the substrate SBx.

Blue light 3 is incident on the phosphor PHX formed on the substrate SBx, and yellow light is output by a yellow phosphor in the phosphor PHX and green light is output by a green phosphor in the phosphor PHX.

Meanwhile, temperature increases more at an incident point of the blue light B, which is incident on the substrate SBx, than other regions, such that it is important to lower the rising temperature.

However, as illustrated herein, if the substrate SBx and the blade BLx are spaced apart from and parallel to each other, air generated by rotation of the blade BLx flows around the substrate Sbx, with almost no contact with the substrate SBx.

Accordingly, the rotation of the blade BLx may not allow for smooth heat dissipation.

Particularly, in the case of using a blue laser beam with an ultra-high power of 100 W or more, due to the heat generated from the substrate SBx during operation, it is difficult to reduce the temperature by using only an air flow AFx generated by the rotation of the blade BLx.

In addition, if the temperature of the phosphor wheel device 430*x* exceeds 200° C., reliability is deteriorated.

In order to solve the above problem, the phosphor wheel device 430 according to an embodiment of the present disclosure utilizes a cap-shaped plate having a bent end, which will be described below with reference to FIG. 7 and subsequent figures.

Figure 7:
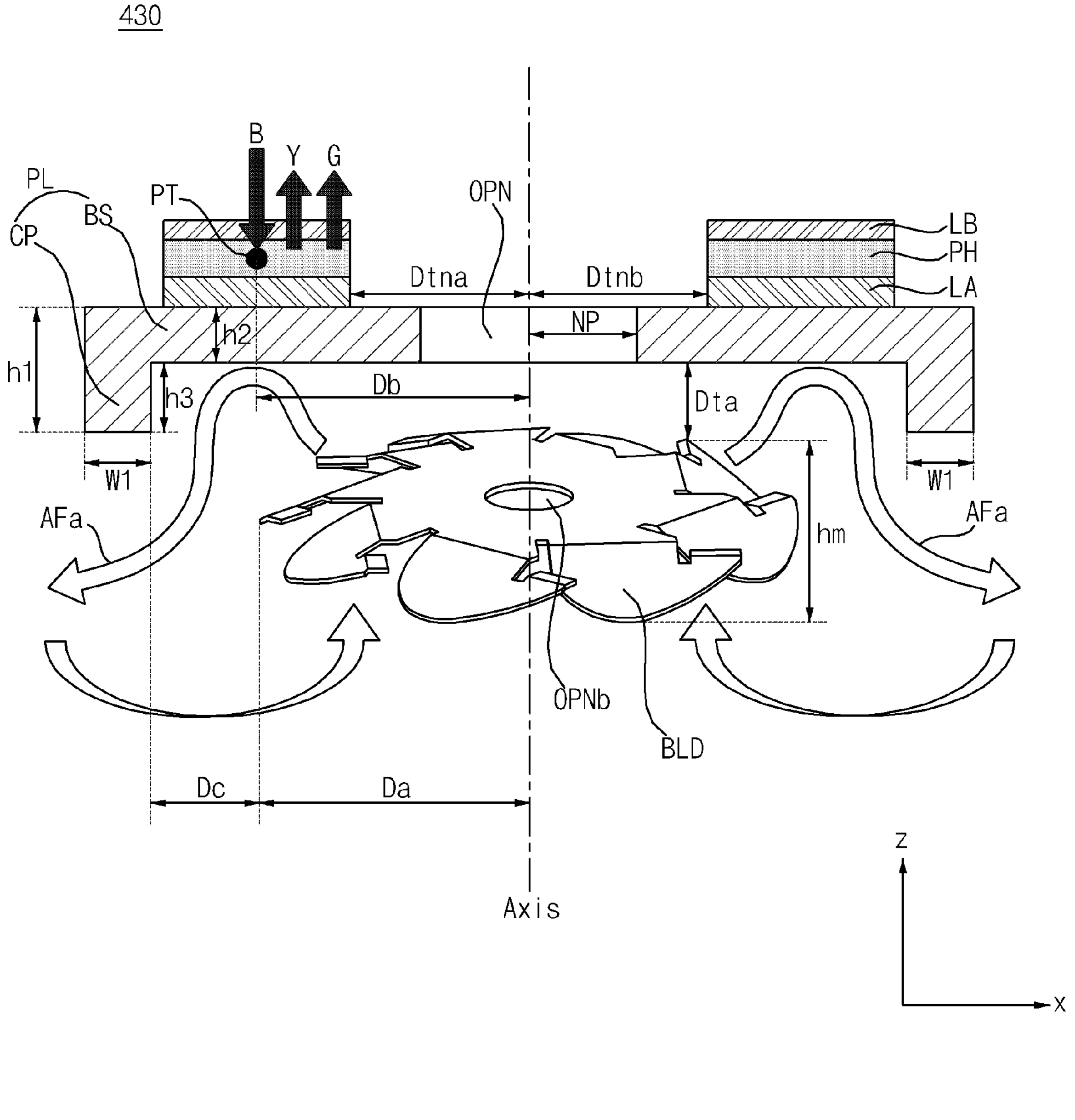
FIG. 7 is an exemplary cross-sectional view of a phosphor wheel device according to an embodiment of the present disclosure.

FIG. 7 is an exemplary cross-sectional view of a phosphor wheel device according to an embodiment of the present disclosure.

Referring to the drawing, the phosphor wheel device 430 according to an embodiment of the present disclosure includes a plate PL having a bent end, a phosphor layer PH coated on a partial region of the plate PL, and a blade BLD spaced below the plate PL.

Meanwhile, the plate PL according to an embodiment of the present disclosure includes a base BS extending in a first direction (x-axis direction), and a protruding member CP attached to both ends of the base BS and extending in a second direction (negative z-axis direction) intersecting the first direction (x-axis direction).

Meanwhile, the plate PL is preferably implemented as an AL plate for heat dissipation.

Meanwhile, the phosphor layer PH according to an embodiment of the present disclosure is disposed in one region of the base BS, and outputs light of at least one color by reflecting light incident on the base BS.

Meanwhile, the blade BLD according to an embodiment of the present disclosure is spaced apart from the plate PL in the second direction (negative z-axis direction) and rotates around a rotation axis Axis.

In the cap-shaped plate PL, air flows to a lower portion of the plate PL where the phosphor layer PH is disposed, and the air is discharged to a lower portion of the protruding member CP.

That is, unlike a flat air flow AFx illustrated in FIG. 6, an air flow AFa in the cap-shape plate PL is formed such that air moves upward with respect to the rotation axis Axis, and then moves downward toward the side.

As the flow path of the air flow AFa in FIG. 7 is bent, the velocity of the air flow AFa is faster than the flat air flow AFx of FIG. 6.

Accordingly, heat dissipation performance may be improved. Further, high brightness light output may be provided. In addition, durability of the phosphor wheel device 430 may be enhanced with improved heat dissipation performance.

Meanwhile, a horizontal distance Dc between the protruding member CP and the blade BLD is preferably greater than a distance between the rotation axis Axis and the phosphor layer PH. Accordingly, air flows to the lower portion of the plate PL where the phosphor layer PH is disposed, and the air is discharged to the lower portion of the protruding member CP, thereby improving heat dissipation performance and providing high brightness light output.

Meanwhile, a distance between an incident point of light, which is incident on the base BS, and the rotation axis Axis is preferably greater than or equal to a distance between the rotation axis Axis and an end of the blade BLD. Accordingly, air flows to the lower portion of the plate PL where the phosphor layer PH is disposed, and the air is discharged to the lower portion of the protruding member CP, thereby improving heat dissipation performance and providing high brightness light output.

Meanwhile, a height hm of the blade BLD is preferably greater than a distance between the base BS and the blade BLD. Accordingly, air flows to the lower portion of the plate PL where the phosphor layer PH is disposed, and the air is discharged to the lower portion of the protruding member CP, thereby improving heat dissipation performance and providing high brightness light output.

Meanwhile, the height hm of the blade BLD is preferably greater than a height h2 of the base BS. Accordingly, air flows to the lower portion of the plate PL where the phosphor layer PH is disposed, and the air is discharged to the lower portion of the protruding member CP, thereby improving heat dissipation performance and providing high brightness light output.

Meanwhile, a height h3 of the protruding member CP is preferably greater than the height hm of the blade BLD. Accordingly, air flows to the lower portion of the plate PL where the phosphor layer PH is disposed, and the air is discharged to the lower portion of the protruding member CP, thereby improving heat dissipation performance and providing high brightness light output.

Meanwhile, the phosphor layer PH may include a yellow phosphor PHY disposed in a first region of the base BS and configured to output yellow light Y based on blue light B incident on the base BS, and a green phosphor PHG disposed in a second region on the base BS and configured to output green light G based on the blue light B incident on the base BS. Accordingly, the yellow light Y and the green light G may be output by the phosphor wheel device 430.

Meanwhile, the phosphor layer PH may further include a red phosphor PHR disposed in a third region on the base BS and configured to output red light R based on the blue light B incident on the base BS. Accordingly, the yellow light Y, the green light G, and the red light R may be output by the phosphor wheel device 430.

Meanwhile, the phosphor layer PH may be sintered and processed into a ceramic form, and then may be adhered to a base BS. Accordingly, high brightness light output may be provided.

Meanwhile, the phosphor wheel device 430 according to an embodiment of the present disclosure may further include a reflective layer LA disposed on the phosphor layer PH and the base BS, and an anti-reflection layer LB disposed on the phosphor layer PH. Accordingly, high brightness light output may be provided.

Meanwhile, the reflective layer LA may include silicone resin and Titanium dioxide (TiO2) nanopowder. Accordingly, high brightness light output may be provided.

FIGS. 8A to 8E are diagrams referred to in the description of FIG. 7.

Figure 8A:
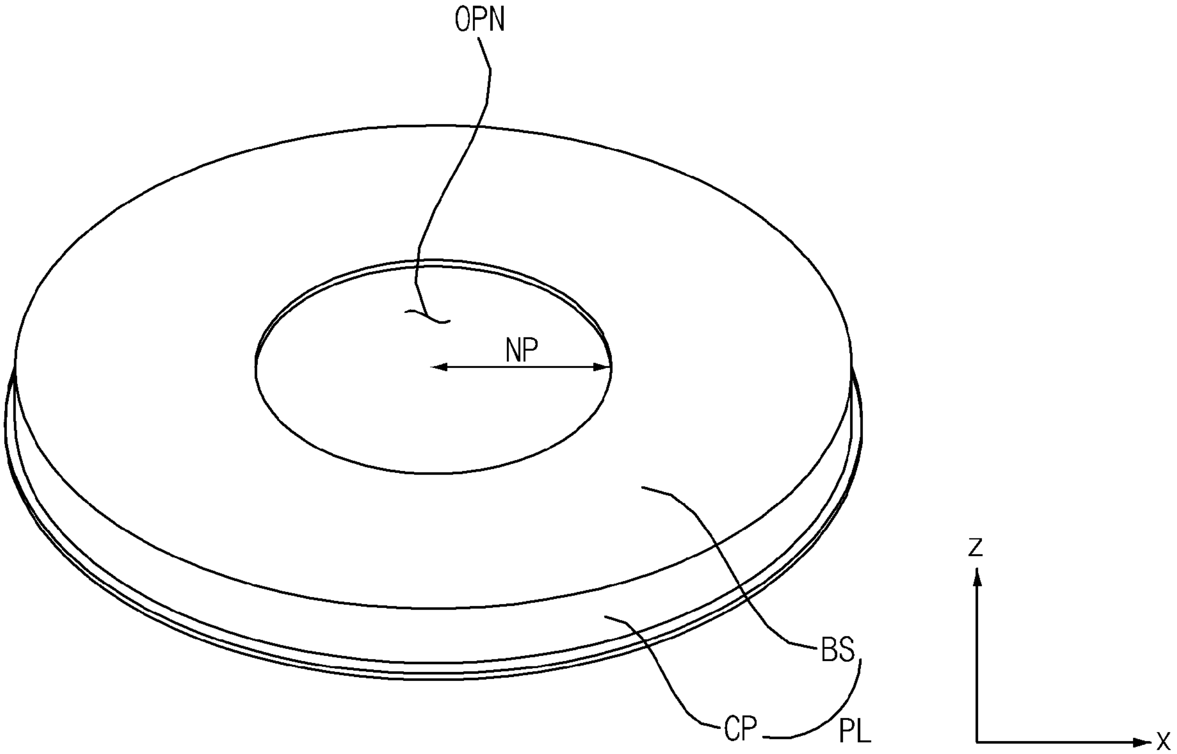
FIGS. 8A to 8E are diagrams referred to in the description of FIG. 7.
Figure 8B:
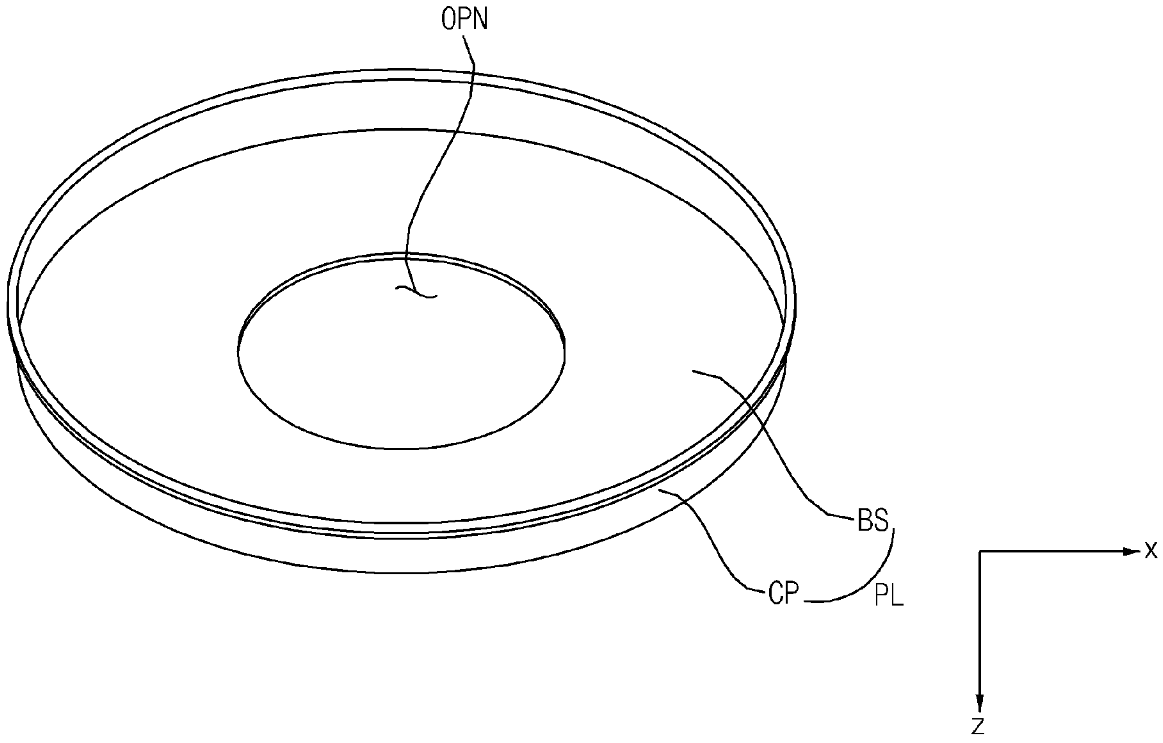

FIG. 8A is a diagram illustrating an upper portion of the plate PL of FIG. 7, and FIG. 8B is a diagram illustrating a lower portion of the plate PL of FIG. 7.

Referring to the drawing, an opening OPN is formed in a central region of the plate PL, and a protruding member CP extending in the negative z-axis direction is formed at an end of a donut-shaped base BS.

That is, the protruding member CP is formed in a shape in which the end of the base BS is bent in the negative z-axis direction.

Meanwhile, an end of the protruding member CP is preferably rounded in consideration of the velocity of the introduced air.

Figure 8C:
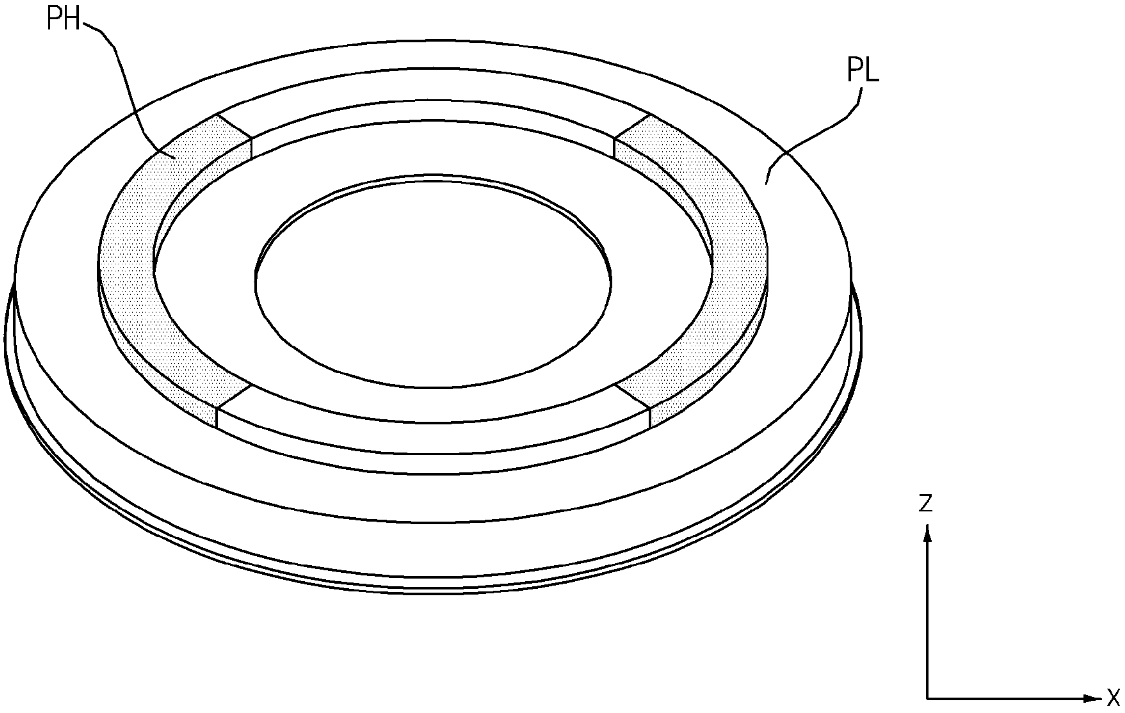

FIG. 8C is a diagram illustrating an example in which the phosphor player PH is formed on the plate PL of FIG. 7.

Referring to the drawing, as illustrated in FIG. 5, the phosphor layer PH may include the yellow phosphor PHY disposed in the first region AR1 on the plate PL and configured to output yellow light Y, and the green phosphor PHG disposed in the second region AR2 on the plate PL and configured to output green light G.

Figure 8D:
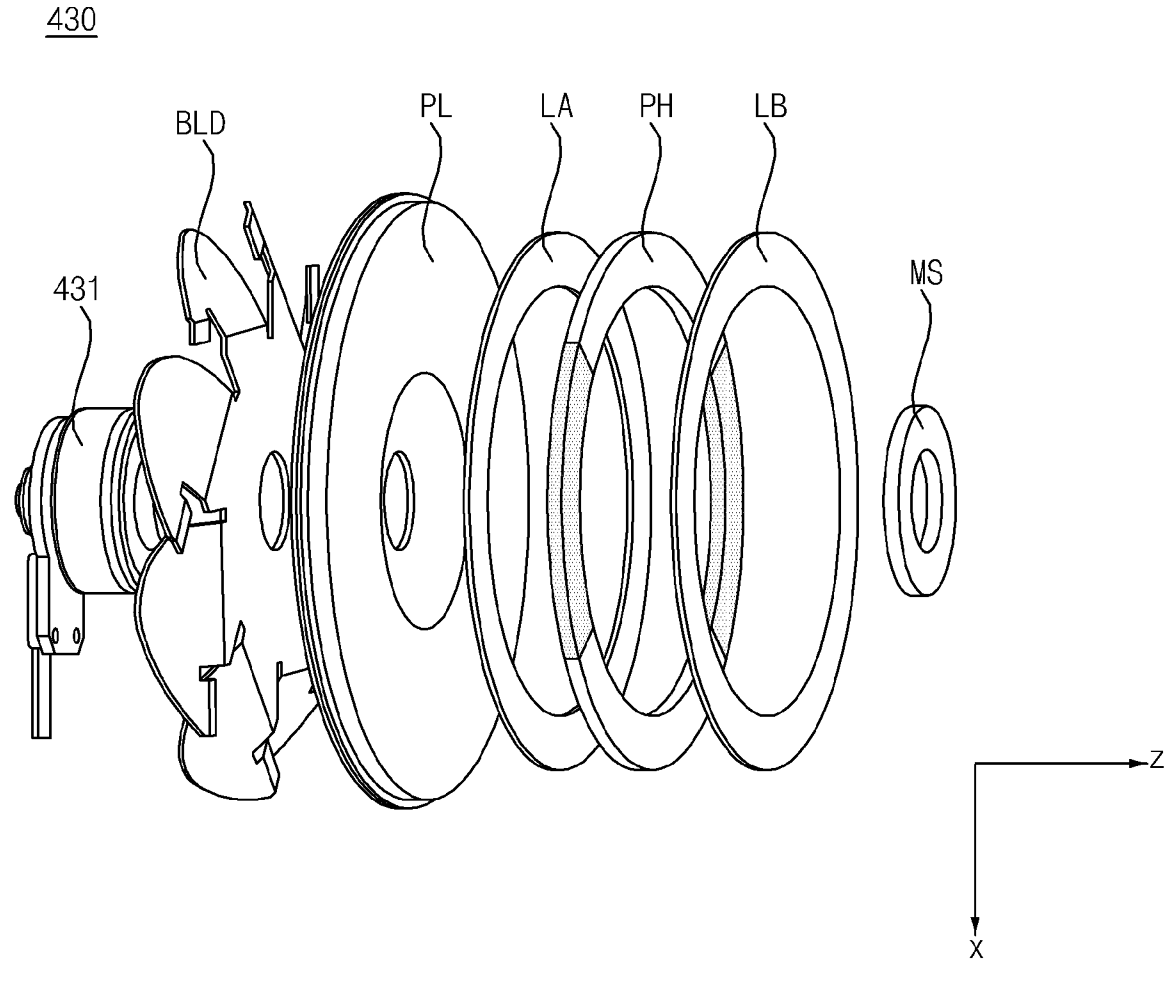

FIG. 8D is an internal exploded view of the phosphor wheel device 430 of FIG. 7.

Referring to the drawing, the motor 431, the blade BLD, the plate PL, the reflective layer LA, the phosphor layer PH, the anti-reflection layer LB, and a housing MS for coupling may be disposed in a direction from the negative z-axis to the positive z-axis.

The phosphor wheel device 430 of FIG. 7 is completed by combining the motor 431, the blade BLD, the plate PL, the reflective layer LA, the phosphor layer PH, the anti-reflection layer LB, and the housing MS for coupling.

Figure 8E:
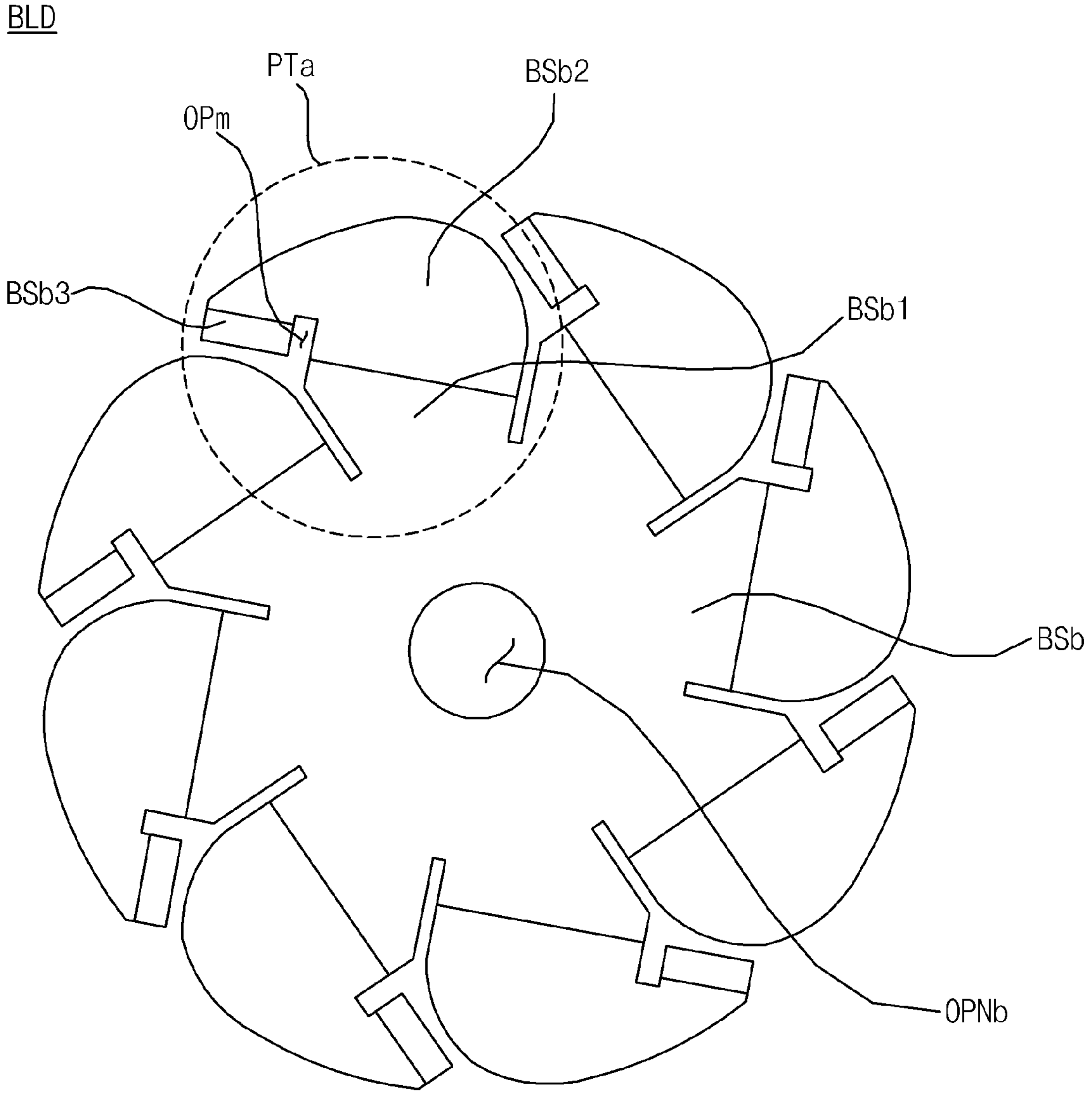

FIG. 8E is a diagram illustrating an upper surface of the blade BLD of FIG. 7.

Referring to the drawing, the blade BLD may include: a base substrate BSb having an opening OPNb formed at a center thereof; a first edge BSb2 bonded to an end of the base substrate BSb and inclined at a predetermined angle; and a second edge BSb3 formed at one end of the first edge BSb2 and spaced apart from another portion of the first edge BSb2 to form a second opening OPm. Accordingly, air flow performance of the introduced air and discharged air may be improved.

In the drawing, an example is illustrated in which the first edge BSb2 is formed in each of eight edge regions OPM, but the number is not limited thereto, and various numbers of edge regions may be formed.

Meanwhile, as a distance from the end of the first edge BSb2 increases, the height of the blade BLD increases, and the air velocity of the air flow AFa increases.

Meanwhile, the second edge may be parallel to the base substrate BSb. Accordingly, performance of the air flow AFa of the introduced air and discharged air may be improved.

Figure 9A:
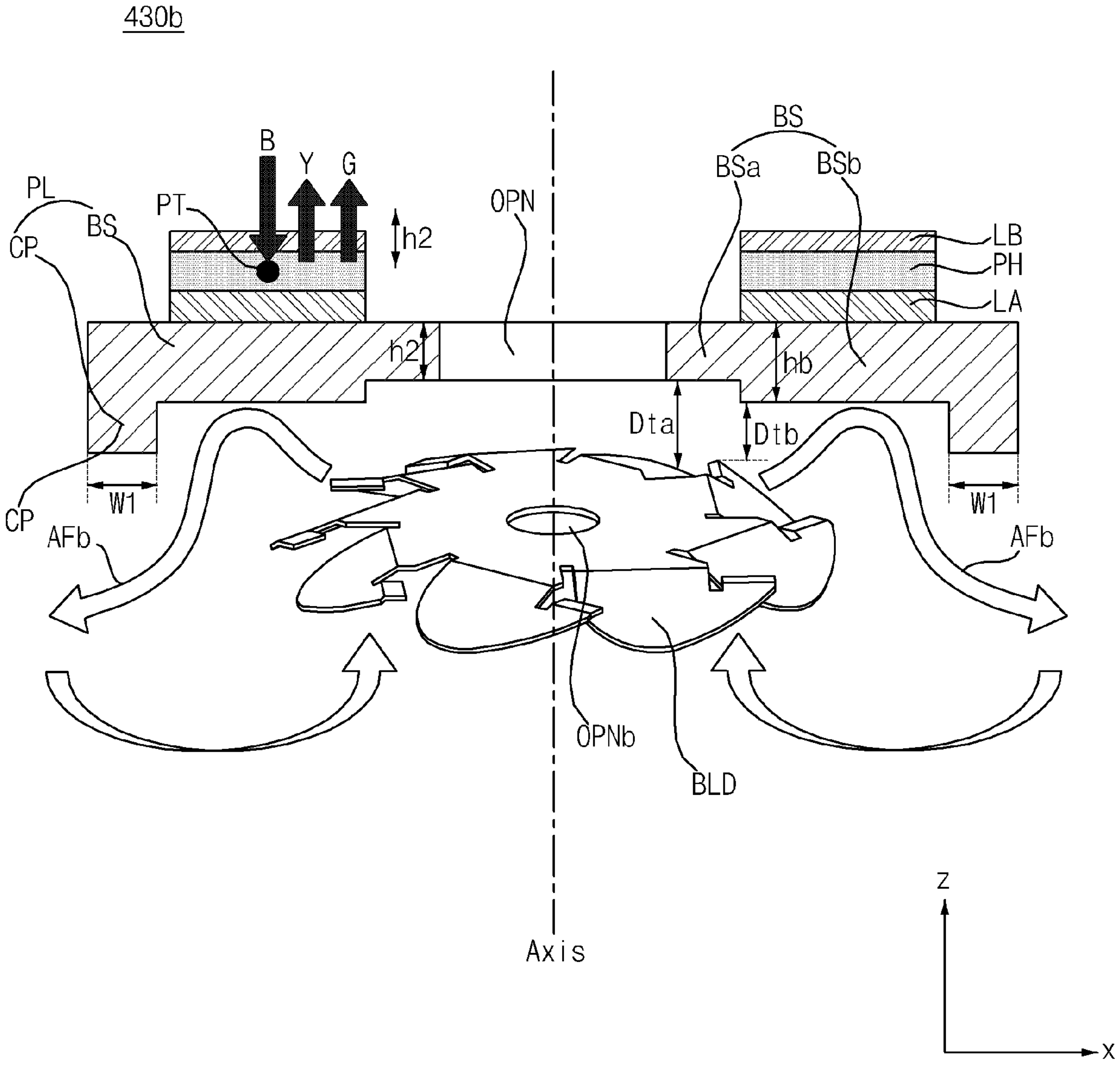
FIG. 9A is an exemplary cross-sectional view of a phosphor wheel device according to another embodiment of the present disclosure.

FIG. 9A is an exemplary cross-sectional view of a phosphor wheel device according to another embodiment of the present disclosure.

Referring to the drawing, a phosphor wheel device 430*b* according to another embodiment of the present disclosure is similar to the phosphor wheel device 430 of FIG. 7, but is different in that the height or thickness of the base BS is not constant.

The phosphor wheel device 430*b* according to another embodiment of the present disclosure includes a plate PL having a bent end, a phosphor layer PH coated on a partial region of the plate PL, and a blade BLD spaced below the plate PL.

The phosphor layer PH and the blade BLD may be formed as illustrated in FIG. 7.

Meanwhile, the plate PL according to an embodiment of the present disclosure includes a base BS extending in a first direction (x-axis direction), and a protruding member CP attached to both ends of the base BS and extending in a second direction (negative z-axis direction) intersecting the first direction (x-axis direction).

Meanwhile, the base BS includes a first base part BSa having a first height h2 and a second base part BSb having a second height hb greater than the first height h2, in which the protruding member CP may be attached to both ends of the second base part BSb and may extend in the second direction (negative z-axis direction) intersecting the first direction (x axis direction).

Particularly, the second base part BSb, corresponding to a region in which the phosphor layer PH is disposed, has a greater height than the first base part BSa corresponding to a region in which the phosphor layer PH is not disposed, thereby providing more effective heat dissipation to a peripheral region of the phosphor layer PH in which temperature is higher.

Accordingly, heat dissipation performance at the lower portion of the plate PL where the phosphor layer PH is disposed may be improved. Further, high brightness light output may be provided.

Figure 9B:
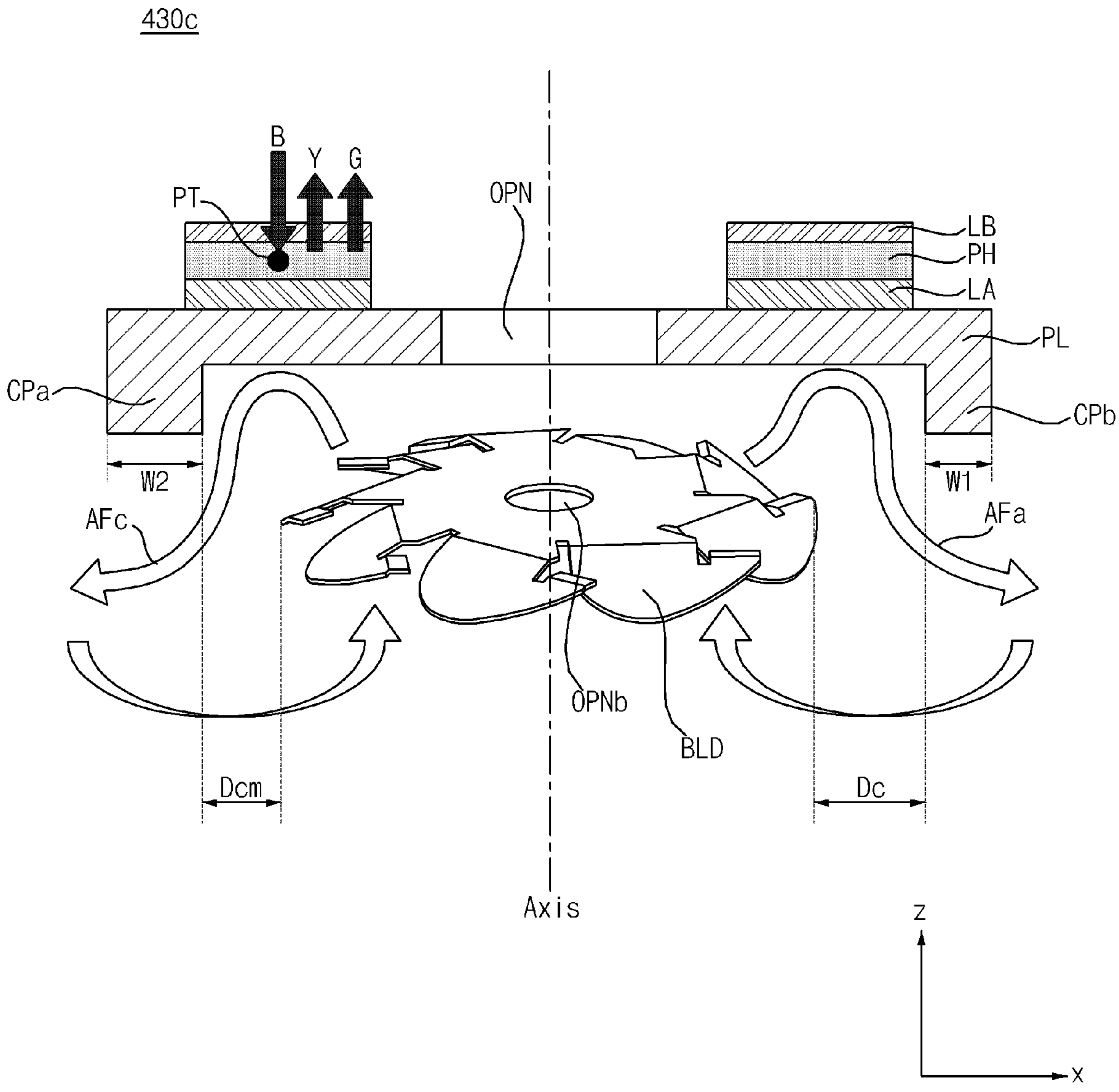
FIG. 9B is an exemplary cross-sectional view of a phosphor wheel device according to yet another embodiment of the present disclosure.

FIG. 9B is an exemplary cross-sectional view of a phosphor wheel device according to yet another embodiment of the present disclosure.

Referring to the drawing, a phosphor wheel device 430*c* according to yet another embodiment of the present disclosure is similar to the phosphor wheel device 430 of FIG. 7, but is different in that the width of the protruding member CP, which is formed at both ends of the base BS, is not constant.

The phosphor wheel device 430*c* according to yet another embodiment of the present disclosure includes a plate PL having a bent end, a phosphor layer PH coated on a partial region of the plate PL, and a blade BLD spaced below the plate PL.

The phosphor layer PH and the blade BLD may be formed as illustrated in FIG. 7.

Meanwhile, the plate PL according to an embodiment of the present disclosure includes a base BS extending in a first direction (x-axis direction), and a protruding member CP attached to both ends of the base BS and extending in a second direction (negative z-axis direction) intersecting the first direction (x-axis direction).

Meanwhile, the protruding member CP includes a first protruding member CPa attached to a first end of the base BS, and a second protruding member CPb attached to a second end of the base BS, in which a width W2 of the first protruding member CPa may be different from a width W1 of the second protruding member CPb.

Particularly, as illustrated herein, the width W2 of the first protruding member CPa may be greater than the width W1 of the second protruding member CPb.

Accordingly, heat dissipation performance at the lower portion of the plate PL where the phosphor layer PH is disposed may be improved. Further, high brightness light output may be provided.

Figure 10A:
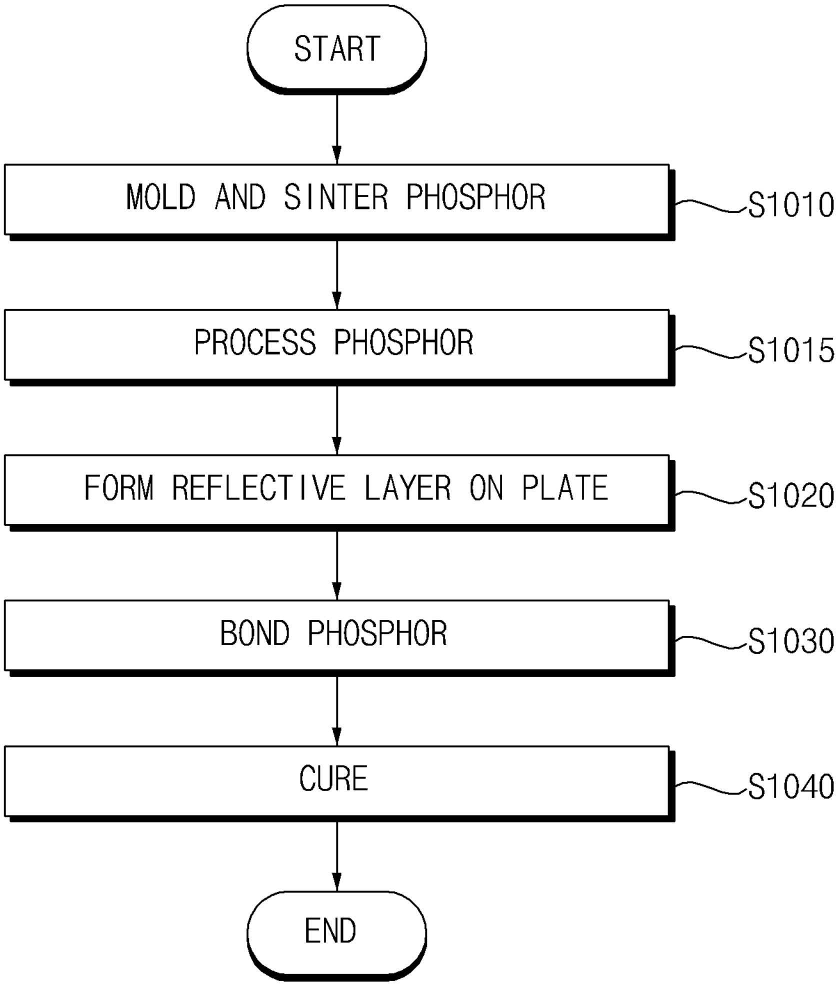
FIG. 10A is a flowchart illustrating an example of a method of manufacturing the phosphor wheel device of FIG. 7.

FIG. 10A is a flowchart illustrating an example of a method of manufacturing the phosphor wheel device of FIG. 7.

Referring to the drawing, the phosphor is first molded and sintered (S1010).

For molding the phosphor PHY, raw nanopowder for achieving, for example, a YAG composition (Y3Al5O12: Ce) and LuAG composition (Lu3Al5O12:Ce), may be filled and pressed in a mold of a desired shape (Ring, segment). In this case, the pressing may be performed at a pressure of 8 Ton (approximately 34 MPa).

In another example, the phosphor PHY may also be molded by filling Fh or YAG nanopowder.

Meanwhile, a uniform molded body may be obtained by selectively performing cold isostatic pressing (CIP).

Meanwhile, high temperature heat treatment may be carried out to densify the molded body through sintering. In this case, high temperature heat treatment may be performed at different temperatures depending on a desired density.

For example, in order to achieve densification of 93% to 98%, high temperature heat treatment may be carried out in a temperature range of about 1500° C. to 1750° C.

Then, the phosphor is processed (S1015).

For example, the phosphor is mirror-polished into a desired shape.

Then, the reflective layer LA is formed on the plate PL (S1020).

The reflective layer LA may include silicone resin and Titanium dioxide (TiO2) nanopowder.

For example, Titanium dioxide (TiO2) having a size of 0.2 um to 0.5 um is mixed with resin to be coated on a cap-shaped plate PL. In this case, the coating may be bar coating, and the thickness thereof may be about 80 um to 120 um.

Then, the phosphor is bonded (S1030) and cured (S1040).

The ceramic phosphor processed in step 1015 (S1015) is adhered to a printed reflective layer (e.g., TiO2 layer) and is cured.

In this case, the curing may be carried out at a temperature of about 150° C. for two hours or more.

Then, the plate PL, on which the phosphor layer PH and the reflective layer LA are formed, is connected to a cooling blade BLD and the motor 431. Accordingly, the phosphor wheel device 430 may be formed.

Figure 10B:
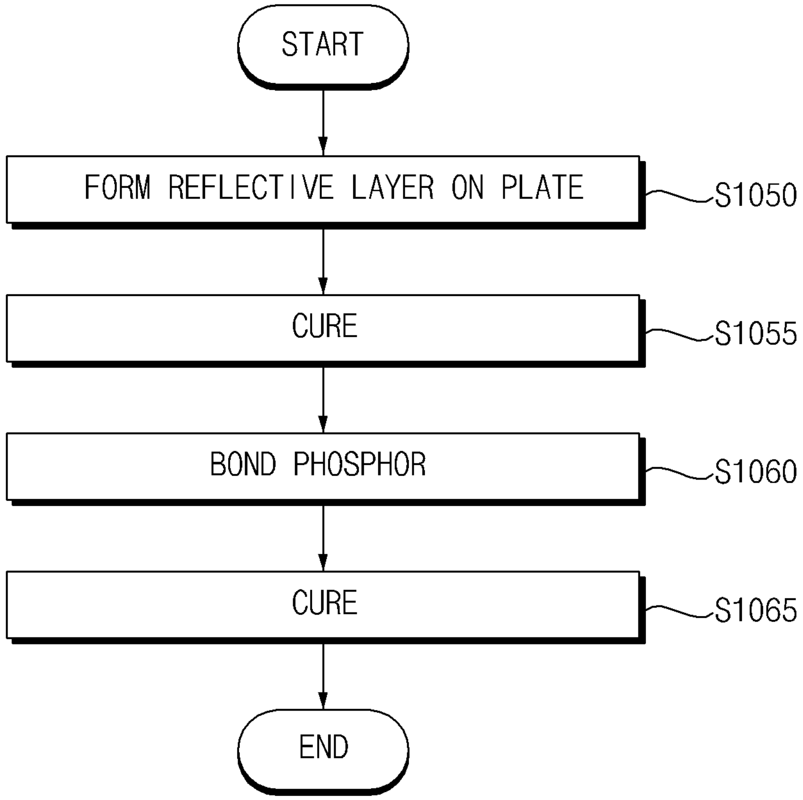
FIG. 10B is a flowchart illustrating another example of a method of manufacturing the phosphor wheel device of FIG. 7.

FIG. 10B is a flowchart illustrating another example of a method of manufacturing the phosphor wheel device of FIG. 7.

Referring to the drawing, the reflective layer LA is first formed on the plate PL (S1050).

The reflective layer LA may include silicone resin and Titanium dioxide (TiO2) nanopowder.

For example, Titanium dioxide (TiO2) having a size of 0.2 um to 0.5 um is mixed with resin to be coated on a cap-shaped plate. In this case, the coating may be bar coating, and the thickness thereof may be about 80 um to 120 um.

Then, curing is carried out (S1055).

The plate PL, on which the reflective layer LA is formed, is cured.

In this case, the curing may be carried out at a temperature of about 150° C. for two to six hours.

Then, the phosphor is bonded (S1060).

For example, a phosphor having an average particle diameter of about 18 um is mixed with the silicone resin to be printed using bar coating.

In this case, the phosphor may include a YAG composition (Y3Al5O12:Ce) for yellow light and LuAG composition (Lu3Al5O12:Ce) for green light.

Then, the plate PL, on which the phosphor layer PH and the reflective layer LA are formed, is cured (S1065).

In this case, the curing may be carried out at a temperature of about 150° C. for two to six hours.

Then, the plate PL, on which the phosphor layer PH and the reflective layer LA are formed, is connected to a cooling blade BLD and the motor 431. Accordingly, the phosphor wheel device 430 may be formed.

FIGS. 11A to 12C are diagrams referred to in the description of FIG. 7.

Figure 11A:
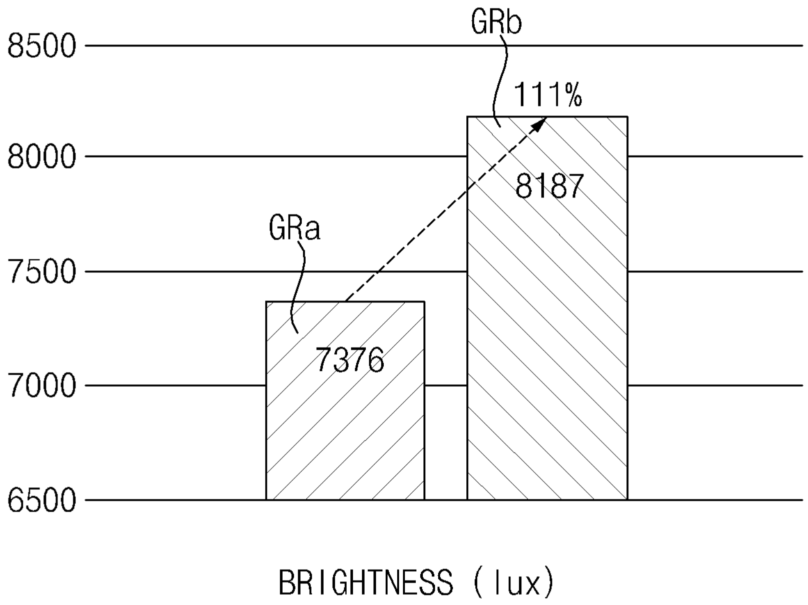
FIGS. 11A to 12C are diagrams referred to in the description of FIG. 7.

FIG. 11A is a diagram illustrating comparison of brightness performance of the phosphor wheel device 430*x* of FIG. 6 and the phosphor wheel device 430 of FIG. 7.

GRa denotes a brightness level of the phosphor wheel device 430*x* of FIG. 6, and GRb denotes a brightness level of the phosphor wheel device 430 of FIG. 7.

In the phosphor wheel device 430 of FIG. 7 according to an embodiment of the present disclosure, brightness is greatly improved, thereby providing high brightness light output.

Figure 11B:
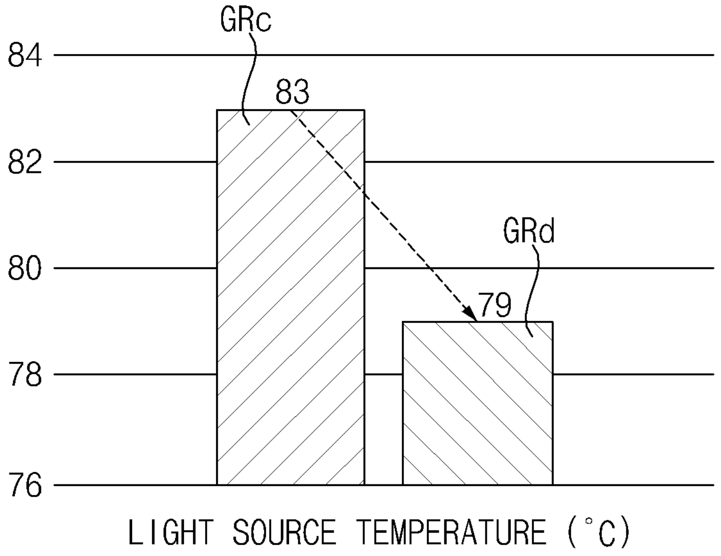

FIG. 11B is a diagram illustrating comparison of temperature performance of the phosphor wheel device 430*x* of FIG. 6 and the phosphor wheel device 430 of FIG. 7.

GRc denotes a temperature level of the phosphor wheel device 430*x* of FIG. 6, and GRd denotes a temperature level of the phosphor wheel device 430 of FIG. 7.

In the phosphor wheel device 430 of FIG. 7 according to an embodiment of the present disclosure, temperature is significantly reduced, such that heat dissipation performance may be greatly improved, leading to improved durability.

Figure 12A:
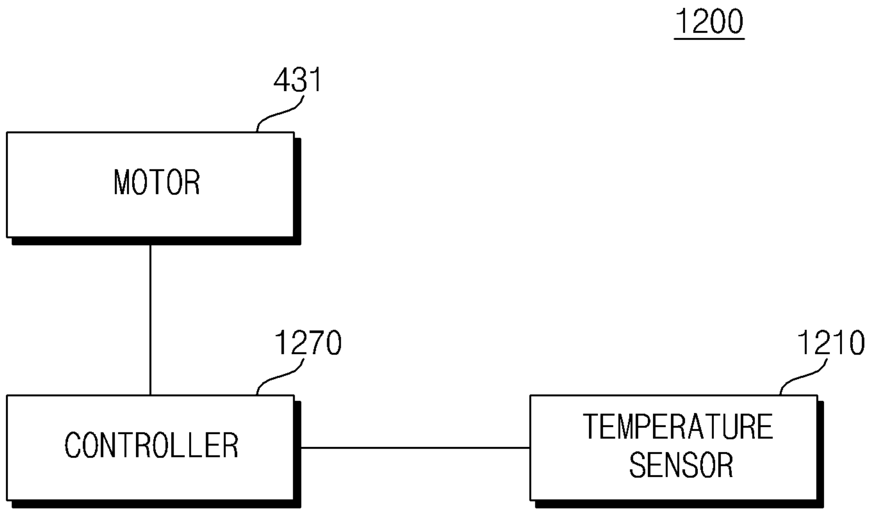

FIG. 12A is an exemplary internal block diagram of a phosphor wheel device according to yet another embodiment of the present disclosure.

Referring to the drawing, a phosphor wheel device 1200 according to yet another embodiment of the present disclosure may further include a motor 431 for rotating a blade BLD, and a controller 1270 for controlling a rotation speed of the motor 431.

Figure 12B:
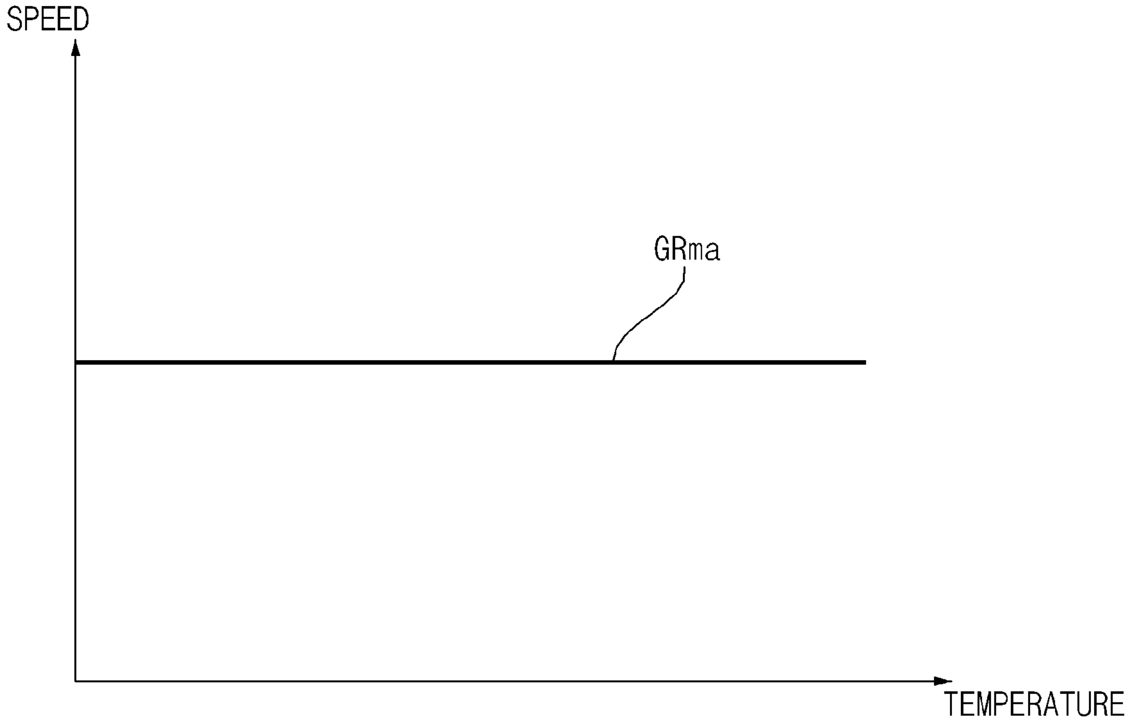

For example, the controller 1270 may control a rotation speed of the motor 431 to remain constant as illustrated in FIG. 12B.

FIG. 12B is a graph GRma showing a constant rotation speed of the motor 431. In this case, the rotation speed of the motor 431 may be about 7200 RPM.

As the motor 431 rotates at a high speed, heat dissipation performance at the lower portion of a cap-shaped plate PL where the phosphor layer PH is disposed may be improved. Further, high brightness light output may be provided.

A phosphor wheel device 1200 according to yet another embodiment of the present disclosure may further include a temperature sensor 1210 for sensing the temperature of a plate PL in the phosphor wheel device 1200.

In addition, the controller 1270 may control a rotation speed of the motor 431 to vary depending on the temperature sensed by the temperature sensor 1210.

Figure 12C:
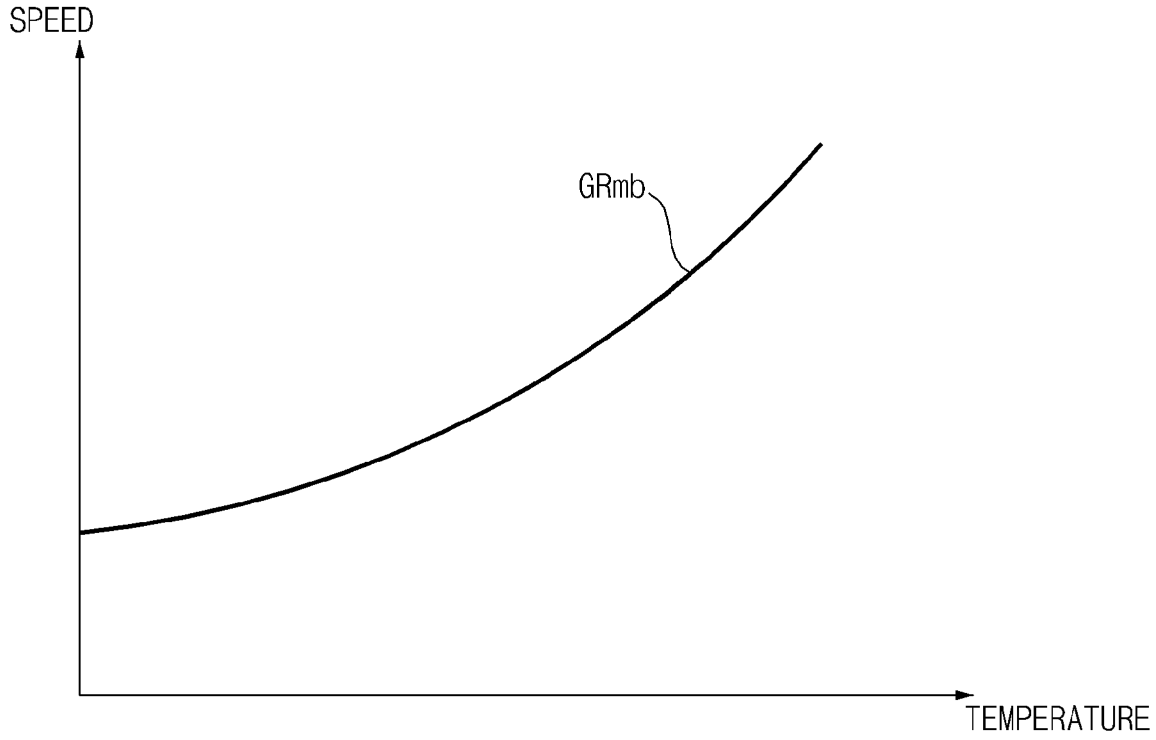

For example, the controller 1270 may perform control so that the rotation speed of the motor 431 increases as the temperature sensed by the temperature sensor 1210 increases, as illustrated in FIG. 12C.

FIG. 12B is a diagram illustrating an example in which the rotation speed of the motor 431 increases as the temperature increase.

As described above, by sensing the temperature of the plate PL and increasing the rotation speed of the motor 431 as the temperature of the plate PL increases, heat dissipation performance at the lower portion of the plate PL where the phosphor layer PH is disposed may be improved. Further, high brightness light output may be provided.

The phosphor wheel device and the image projection apparatus including the same according to the embodiments of the present disclosure as described above is not limited in its application of the configurations and methods, but the entirety or a portion of the embodiments can be selectively combined to be configured into various modifications.

While the present disclosure has been particularly shown and described with reference to preferred embodiments thereof, it will be understood by those skilled in the art that the present disclosure is not limited to those exemplary embodiments and various changes in form and details may be made therein without departing from the scope and spirit of the invention as defined by the appended claims and should not be individually understood from the technical spirit or prospect of the present disclosure.

What is claimed is:

1. A phosphor wheel device comprising:

a plate to rotate around a rotation axis, and comprising a base extending in a first direction and a protruding member attached to both ends of the base and extending in a second direction intersecting the first direction;

a phosphor layer disposed in a first region of the base and configured to output light of at least one color by reflecting light incident on the base; and a blade spaced apart from the plate in the second direction and to rotate around the rotation axis, wherein the blade comprises:

a base substrate having an opening formed at a center thereof;

a first edge bonded to an end of the base substrate and inclined at a predetermined angle; and a second edge formed at one end of the first edge and spaced apart from another portion of the first edge to form a second opening.

2. The phosphor wheel device of claim 1, wherein a horizontal distance between the protruding member and the blade is greater than a distance between the rotation axis and the phosphor layer.

3. The phosphor wheel device of claim 1, wherein a distance between an incident point of light, which is incident on the base, and the rotation axis is greater than or equal to a distance between the rotation axis and an end of the blade.

4. The phosphor wheel device of claim 1, wherein a height of the blade is greater than a distance between the base and the blade.

5. The phosphor wheel device of claim 1, wherein the height of the blade is greater than a height of the base.

6. The phosphor wheel device of claim 1, wherein a height of the protruding member is greater than the height of the blade.

7. The phosphor wheel device of claim 1, wherein the phosphor layer comprises:

a yellow phosphor disposed in the first region of the base and configured to output yellow light based on blue light incident on the base; and a green phosphor disposed in a second region of the base and configured to output green light based on the blue light incident on the base.

8. The phosphor wheel device of claim 7, wherein the phosphor layer further comprises a red phosphor disposed in a third region of the base and configured to output red light based on the blue light incident on the base.

9. The phosphor wheel device of claim 1, further comprising:

a reflective layer disposed on the phosphor layer and the base; and an anti-reflection layer disposed on the phosphor layer.

10. The phosphor wheel device of claim 9, wherein the reflective layer comprises silicone resin and Titanium dioxide ($TiO_2$) nanopowder.

11. The phosphor wheel device of claim 1, wherein the phosphor layer is sintered and processed into a ceramic form, and the ceramicized phosphor layer is adhered to the base.

12. The phosphor wheel device of claim 1, wherein the second edge is parallel to the base substrate.

13. The phosphor wheel device of claim 1, further comprising:
a motor configured to rotate the blade; and
a controller configured to control a rotation speed of the motor,
wherein the controller is configured to control the rotation speed of the motor to remain constant.

14. The phosphor wheel device of claim 1, further comprising:
a motor configured to rotate the blade;
a temperature sensor configured to sense temperature of the plate; and
a controller configured to control a rotation speed of the motor,
wherein the controller is configured to increase the rotation speed of the motor as the temperature sensed by the temperature sensor increases.

15. A phosphor wheel device comprising:
a plate to rotate around a rotation axis, and comprising a base extending in a first direction and a protruding member attached to both ends of the base and extending in a second direction intersecting the first direction;
a phosphor layer disposed in one region of the base and configured to output light of at least one color by reflecting light incident on the base; and
a blade spaced apart from the plate in the second direction and to rotate around the rotation axis,
wherein the base comprises a first base part having a first height and a second base part having a second height greater than the first height, and
wherein the protruding member is attached to both ends of the second base part and extends in the second direction intersecting the first direction.

16. A phosphor wheel device comprising:
a plate to rotate around a rotation axis, and comprising a base extending in a first direction and a protruding member attached to both ends of the base and extending in a second direction intersecting the first direction;
a phosphor layer disposed in one region of the base and configured to output light of at least one color by reflecting light incident on the base; and
a blade spaced apart from the plate in the second direction and to rotate around the rotation axis,
wherein the protruding member comprises:
a first protruding member attached to a first end of the base; and
a second protruding member attached to a second end of the base, and
wherein a width of the first protruding member is different from a width of the second protruding member.

17. An image projection apparatus comprising:
a light source configured to output blue light; and
a phosphor wheel device configured to output a plurality of colors of light based on the blue light incident upon rotation,
wherein the phosphor wheel device comprises:
a plate to rotate around a rotation axis, and comprising a base extending in a first direction and a protruding member attached to both ends of the base and extending in a second direction intersecting the first direction;
a phosphor layer disposed in a first region of the base and configured to output light of at least one color by reflecting light incident on the base; and
a blade spaced apart from the plate in the second direction and to rotate around the rotation axis, and
wherein the blade comprises:
a base substrate having an opening formed at a center thereof;
a first edge bonded to an end of the base substrate and inclined at a predetermined angle; and
a second edge formed at one end of the first edge and spaced apart from another portion of the first edge to form a second opening.

18. The image projection apparatus of claim 17, wherein the phosphor layer comprises:
a yellow phosphor disposed in the first region of the base and configured to output yellow light based on blue light incident on the base; and
a green phosphor disposed in a second region of the base and configured to output green light based on the blue light incident on the base.

* * * * *